(12) United States Patent
Flick

(10) Patent No.: US 9,170,585 B2
(45) Date of Patent: *Oct. 27, 2015

(54) REMOTE CLIMATE CONTROL DEVICE INCLUDING ELECTRICAL HEATER FOR A HYBRID VEHICLE AND ASSOCIATED METHODS

(75) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 1997 days.

This patent is subject to a terminal disclaimer.

(21) Appl. No.: 12/180,992

(22) Filed: Jul. 28, 2008

(65) Prior Publication Data

US 2010/0023210 A1 Jan. 28, 2010

(51) Int. Cl.

| G05D 23/00 | (2006.01) |
|---|---|
| B60H 1/02 | (2006.01) |
| B60K 6/20 | (2007.10) |
| G05D 23/19 | (2006.01) |
| B60H 1/00 | (2006.01) |
| B60H 1/22 | (2006.01) |
| B60W 10/06 | (2006.01) |
| B60W 20/00 | (2006.01) |

(52) U.S. Cl.
CPC ............ G05D 23/1905 (2013.01); B60H 1/004 (2013.01); B60H 1/00657 (2013.01); B60H 1/2218 (2013.01); B60W 10/06 (2013.01); B60W 20/00 (2013.01); B60W 2510/244 (2013.01)

(58) Field of Classification Search
CPC ........ B60R 25/00; B60R 11/02; B60R 25/10; G05D 23/1905; B60H 1/004; B60H 1/2218; B60W 10/06; B60W 20/00; B60W 2510/244

USPC .......................................................... 701/36
See application file for complete search history.

(56) References Cited

U.S. PATENT DOCUMENTS

| 6,346,876 | B1 | 2/2002 | Flick |
|---|---|---|---|
| 6,357,244 | B1 | 3/2002 | Mori ............................... 62/231 |
| 6,529,124 | B2 | 3/2003 | Flick |
| 6,756,885 | B1 | 6/2004 | Flick |
| 6,756,886 | B2 | 6/2004 | Flick |
| 6,791,202 | B2 | 9/2004 | McCullough ............... 290/38 C |
| 6,812,829 | B1 | 11/2004 | Flick ........................ 340/426.13 |

(Continued)

FOREIGN PATENT DOCUMENTS

| JP | 11062793 | 3/1999 |
|---|---|---|
| JP | 2006298134 | 2/2006 |

Primary Examiner — Redhwan k Mawari
Assistant Examiner — Rodney P King
(74) Attorney, Agent, or Firm — Allen, Dyer, Doppelt, Milbrath & Gilchrist, P.A.

(57) ABSTRACT

A remote climate control system is for a hybrid vehicle having a rechargeable electrical power source and an electrical heater selectively powered thereby, a sensor associated with the rechargeable electrical power source, and a data communications bus extending throughout the hybrid vehicle. At least one of the electrical heater and the sensor is coupled to the data communications bus. The remote climate control system includes a remote transmitter and a receiver to be positioned at the hybrid vehicle for receiving signals from said remote transmitter. A vehicle remote climate controller cooperates with said receiver and to be coupled to the data communications bus extending within the hybrid vehicle for communication thereover to selectively operate the electrical heater responsive to the sensor and said remote transmitter.

32 Claims, 12 Drawing Sheets

(56) References Cited

U.S. PATENT DOCUMENTS

| | | |
|---|---|---|
| 7,010,402 B2 | 3/2006 | Flick |
| 7,031,826 B2 | 4/2006 | Flick |
| 7,046,126 B2 | 5/2006 | Flick ........................ 340/426.36 |
| 7,061,368 B2 | 6/2006 | Okada ............................ 340/5.6 |
| 7,068,153 B2 | 6/2006 | Flick |
| 7,091,822 B2 | 8/2006 | Flick et al. |
| 7,205,679 B2 | 4/2007 | Flick |
| 7,224,083 B2 | 5/2007 | Flick |
| 7,369,936 B2 | 5/2008 | Flick |
| 7,378,945 B2 | 5/2008 | Flick |
| 7,441,414 B2 | 10/2008 | Ziehr et al. |
| 2002/0096572 A1* | 7/2002 | Chene et al. ..................... 236/62 |
| 2003/0226836 A1* | 12/2003 | Miura et al. .................. 219/204 |
| 2005/0174219 A1* | 8/2005 | Flick ........................ 340/426.13 |
| 2005/0179323 A1 | 8/2005 | Flick |
| 2006/0075766 A1 | 4/2006 | Ziehr et al. ...................... 62/186 |
| 2007/0073908 A1* | 3/2007 | Gormley .......................... 710/8 |
| 2007/0073944 A1 | 3/2007 | Gormley ......................... 710/72 |
| 2007/0102930 A1 | 5/2007 | Koike et al. .................... 290/18 |
| 2007/0106441 A1 | 5/2007 | Ono et al. ....................... 701/36 |
| 2007/0152640 A1* | 7/2007 | Sasaki et al. ................. 320/150 |
| 2008/0117079 A1 | 5/2008 | Hassan ........................ 340/901 |
| 2009/0064695 A1 | 3/2009 | Kojima |
| 2010/0019047 A1 | 1/2010 | Flick |
| 2010/0019048 A1 | 1/2010 | Flick |
| 2010/0019049 A1 | 1/2010 | Flick |
| 2010/0019896 A1 | 1/2010 | Flick |
| 2010/0019928 A1 | 1/2010 | Flick |

* cited by examiner

REMOTE CLIMATE CONTROL DEVICE INCLUDING ELECTRICAL HEATER FOR A HYBRID VEHICLE AND ASSOCIATED METHODS

FIELD OF THE INVENTION

The present invention relates to the field of vehicle climate control, and, more particularly, to remote vehicle climate control devices and related methods.

BACKGROUND OF THE INVENTION

The passenger compartment of a vehicle parked outside during a cold day may become very cold, with temperatures reaching that of the ambient air outside the vehicle. Likewise, the passenger compartment of a vehicle parked outside during a hot day may become very hot, very quickly, with temperatures that greatly exceed that of the ambient air outside the vehicle.

Some drivers start a vehicle, activate the vehicle's climate control system, then leave the vehicle until the climate control system begins to heat or cool the vehicle. However, this requires the driver to leave the comfort of the indoors, momentarily enter the vehicle, start the engine and operate the climate control system, and leave the vehicle unattended.

To avoid this, remote starting systems have been developed which allow a driver to start a vehicle without entering the vehicle. However, such systems may be incompatible with hybrid electric vehicles or electric vehicles. Similarly, such systems may lack desired features.

The air conditioning system of a standard vehicle having an internal combustion engine as its prime mover typically employs a compressor. On such a vehicle, this compressor is powered by the internal combustion engine via mechanical energy transferred from the crankshaft to the compressor through the use of a serpentine or v-shaped belt. The heating system of such a vehicle uses waste heat of the internal combustion engine to heat the passenger compartment.

Efforts have been made at remotely activating the climate control system of a hybrid or electric vehicle. U.S. Pub. No. 2006/0075766 to Ziehr et al., for example, discloses a remote climate control system for pre-cooling or pre-heating the passenger compartment of a hybrid vehicle that includes a combustion engine, an electrically activatable window, a heater, an electrically powered blower, and a passenger compartment temperature sensor. The remote climate control system is hard wired to a starter of the combustion engine, the electrically activatable window, the heater, the electrically powered blower, and the passenger compartment temperature sensor.

The remote climate control system includes a controller to read the passenger compartment temperature from the sensor. If the temperature is greater than a first predetermined value, the controller opens the activatable window and activates the electrically powered blower. If the temperature is less than a predetermined value, the controller starts the hybrid vehicle and activates the heater. The heater uses waste heat of the combustion engine to cool the passenger compartment. During cooling or heating, the controller monitors the temperature of the passenger compartment and deactivates the blower and the heater, respectively, when the temperature drops below, or rises above, a second predetermined value.

US Pub. No. 2008/0117079 to Hassan discloses a remote starting system for hybrid vehicles. The remote starting system includes a remote transmitter operable to communicate a start signal and a controller at the hybrid vehicle that receives the start signal. The controller can be coupled to a data communications bus of the hybrid vehicle and processes images captured by at least one imaging device to determine if the images are indicative of the hybrid vehicle being parked in an enclosed environment, such as a garage. The controller starts the combustion engine of the hybrid vehicle in response to the remote transmitter and the processed images. The controller can also control the climate control system of the hybrid vehicle after starting the combustion engine.

In particular, the controller can activate an air conditioning (AC) unit that is mechanically powered by the combustion engine, in order to cool the passenger compartment. The controller may also activate an auxiliary heater coil, or a heater that uses waste heat of the combustion engine, to heat the passenger compartment.

U.S. Pat. No. 6,357,244 to Mori discloses a plurality of remote climate control systems, each for an electric vehicle, and a common remote transmitter to activate the remote climate control system of each electric vehicle, respectively. Each electric vehicle has an AC unit, a battery, and a sensor to sense the voltage of the battery. The remote climate control system of each vehicle includes a controller that is hard wired to the AC unit and sensor. The controller reads the voltage of the battery using the sensor and selectively operates the AC unit based upon the voltage of the battery and signals received from the common remote transmitter. If the voltage of the battery falls below a predetermined value, the remote climate control system deactivates the AC unit.

In view of the foregoing limitations of the prior art, a remote climate control system having additional features and compatibility may be desirable.

SUMMARY OF THE INVENTION

In view of the foregoing background, it is therefore an object of the present invention to provide a remote climate control system for a hybrid vehicle.

This and other objects, features, and advantages in accordance with the present invention are provided by a remote climate control system for a hybrid vehicle that may comprise a rechargeable electrical power source, an electrical heater selectively powered by the rechargeable electrical power source, and a sensor associated with the rechargeable electrical power source. A data communications bus may extend throughout the hybrid vehicle, and at least one of the electrical heater and the sensor may be coupled to the data communications bus.

The remote climate control system may include a remote transmitter and a receiver to be positioned at the hybrid vehicle for receiving signals from the remote transmitter. The remote climate control system may also include a vehicle remote climate controller to cooperate with the receiver. The vehicle remote climate controller may be coupled to the data communications bus extending within the hybrid vehicle for communication thereover to selectively operate the electrical heater responsive to the sensor and the remote transmitter.

The sensor may be coupled to the data communications bus and the vehicle remote climate controller may receive signals from the sensor via the data communications bus. The electrical heater may be coupled to the data communications bus and the vehicle remote climate controller may send signals to the electrical heater via the data communications bus.

The vehicle remote climate controller may disable the electrical heater based upon the sensor sensing a voltage of the rechargeable electrical power source being below a threshold. This feature helps to prevent excessive discharging of the rechargeable electrical power source, due to operation of the heater, that might leave a driver stranded and the hybrid vehicle inoperable.

The hybrid vehicle may have a combustion engine that provides mechanical energy to a generator or alternator that recharges the rechargeable electrical power source. The vehicle remote climate controller may start the combustion engine based upon the sensor sensing a voltage of the rechargeable electrical power source being below a threshold. This may be done to charge the rechargeable electrical power source and to thus help prevent excessive discharging thereof.

The vehicle remote climate controller may enable the electrical heater based upon the sensor sensing the rechargeable electrical power source being coupled to an external power source. Also, the hybrid vehicle may have a security circuit coupled to the electrical heater for selectively enabling operation thereof. Furthermore, the vehicle remote climate controller may bypass the security circuit to enable remote operation of the electrical heater.

The remote transmitter may be a remote wireless handheld transmitter that is carried by a user when away from the vehicle. In addition, the vehicle remote climate controller may comprise a multi-vehicle compatible remote climate controller. This may reduce the need to produce a variety of different versions of the remote climate control system for different hybrid or electric vehicles.

A method aspect is directed to a method of installing a remote climate control system in a hybrid vehicle comprising a rechargeable electrical power source and an electrical heater selectively powered thereby, a sensor associated with the rechargeable electrical power source, and a data communications bus extending throughout the hybrid vehicle. At least one of the electrical heater and the sensor may be coupled to the data communications bus. The method may comprise coupling a vehicle remote climate controller to the data communications bus extending within the hybrid vehicle for communication thereover. The vehicle remote climate controller may cooperate with a receiver to selectively operate the electrical heater responsive to the sensor and the remote transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
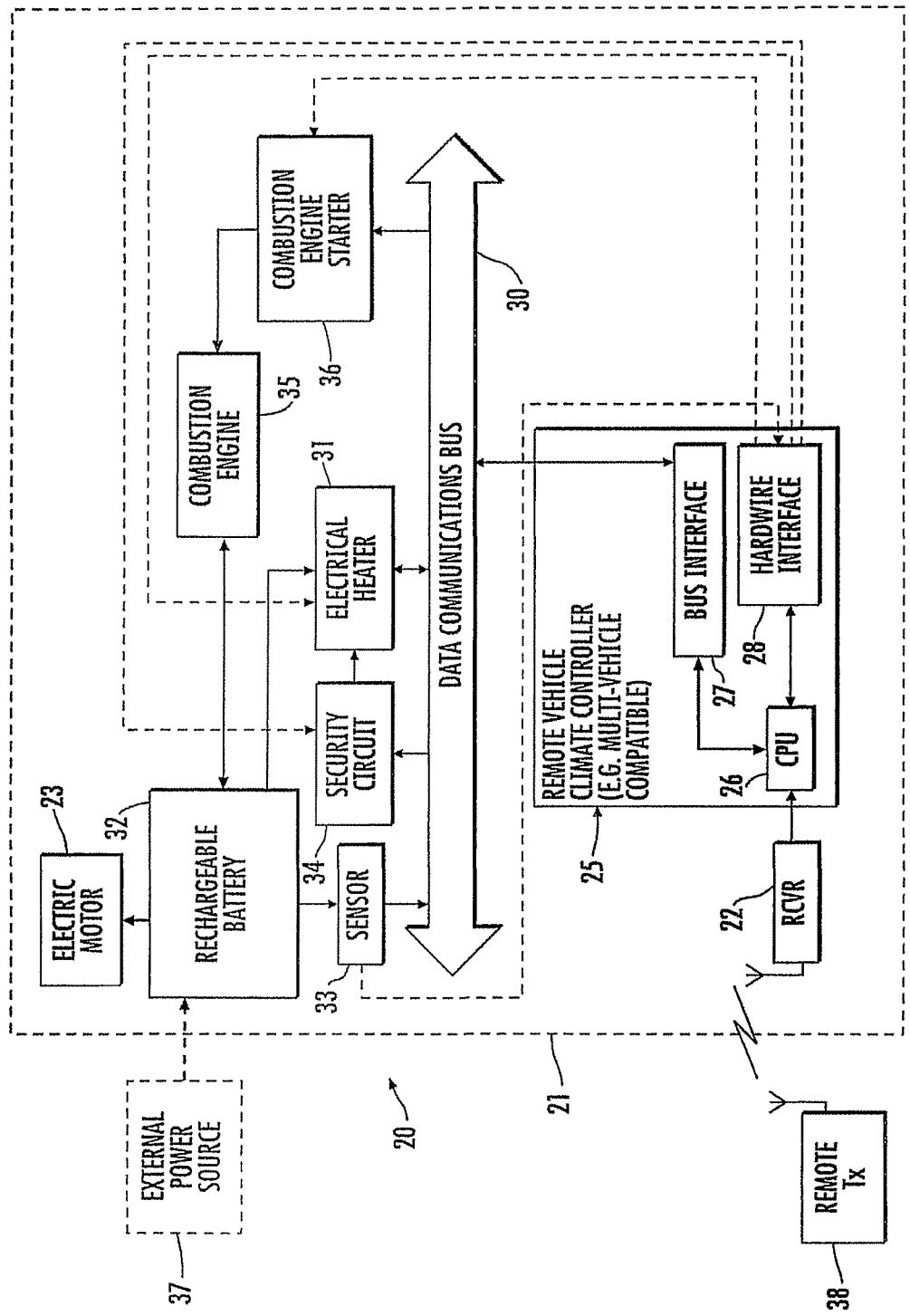
FIG. 1 is a schematic block diagram of a remote climate control system for a hybrid vehicle in accordance with the present invention.

Referring initially to FIG. 1, a remote climate control system 20 for a hybrid vehicle 21 is now described. The hybrid vehicle 21 has a rechargeable battery 32, although those of skill in the art will appreciate that the hybrid vehicle may have another rechargeable electrical power source, such as a capacitor or flywheel/generator, in addition to or instead of the rechargeable battery. The hybrid vehicle 21 has a combustion engine 35 that operates a generator or alternator (not shown) to recharge the rechargeable battery 32 and an electric motor 23. Those skilled in the art will appreciate that the hybrid vehicle 21 may have more than one electric motor 23 and that the electric motor is coupled to the rechargeable battery 32. An optional separate combustion engine starter 36 starts the combustion engine. Those of skill in the art will understand that the combustion engine 35 may instead be started by the electric motor 23.

It should be understood that the combustion engine 35 may be an internal combustion engine that burns gasoline, diesel, ethanol, or other fuels. Rather than a combustion engine 35, the hybrid vehicle 21 may instead have an external heat engine, such as a Stirling engine.

The hybrid vehicle 21 further comprises an electrical heater 31 selectively powered by the rechargeable battery 32 and a sensor 33 associated with the rechargeable battery. The electrical heater 31 may be a resistive heater or other suitable heater as known to those of skill in the art. The electrical heater 31 may be a combination heater, for example a heater core with electrical heater coils, that employs both resistive heating and the use of waste heat from the combustion engine 35 to heat the passenger compartment of the hybrid vehicle 21.

The hybrid vehicle 21 may also include a security circuit 34 connected to the electrical heater 31. The security circuit 34 selectively disables the electrical heater 31. Those of skill in the art will appreciate that, in some applications, the security circuit 34 may also be connected to the combustion engine starter 36 to selectively disable the operation thereof and therefore the operation of the combustion engine. 35. Indeed, in some applications, the security circuit 34 may selectively disable operation of a plurality of, or all of, the devices and functions of the hybrid vehicle 21. The security circuit 34 may be considered as an ignition switch of a conventional internal combustion engine vehicle.

The hybrid vehicle 21 has a data communications bus 30 extending throughout. The data communications bus 30 may extend through at least one of the engine compartment, the passenger compartment, and the trunk of the hybrid vehicle 21.

The sensor 33 is coupled to the rechargeable battery 32 and reads the voltage thereof. The sensor 33 may, additionally or alternatively, be able to detect whether the rechargeable battery is connected to an external power source 37. The external power source 37 may be an electrical socket or recharging station, for example.

The electrical heater 31, the sensor 33, the security circuit 34, and the combustion engine starter 36 are each coupled to the data communications bus 30 for communication thereover. Those of skill in the art will understand that each of the electrical heater 31, the sensor 33, the security circuit 34, and the combustion engine starter 36 need not be on the data communications bus 30. Indeed, one of, or a plurality of the electrical heater 31, the sensor 33, the security circuit 34, and the combustion engine starter 36 may be on the data communications bus 30. Furthermore, each of the electrical heater 31, the sensor 33, the security circuit 34, and the combustion engine starter 36 may communicate unidirectionally via the data communications bus 30, or may communicate bidirectionally via the data bus. Each of the electrical heater 31, the sensor 33, the security circuit 34, and the combustion engine starter 36 need not communicate in the same manner via the data communications bus 30. For example, the electrical heater 31 may communicate bidirectionally while the sensor 33 communicates unidirectionally.

It should be understood that there may be intervening circuitry between the data communications bus 30 and at least one of the electrical heater 31, the sensor 33, the security circuit 34, and the combustion engine starter 36.

The remote climate control system 20 includes a remote transmitter 38 and a receiver 22 positioned at the hybrid vehicle 21 for receiving signals from the remote transmitter. The remote climate controller 25 may be a multi-vehicle compatible remote climate controller to cooperate with the receiver 22. Those of skill in the art will understand that the receiver 22 and the vehicle remote climate controller 25 may be associated together in a same housing. In fact the receiver 22 and the vehicle remote climate controller 25 may each be embodied on a same printed circuit board or even in a same integrated circuit. The vehicle remote climate controller 25 bypasses the security circuit 34 to enable operation of the electrical heater 31.

More details of multi-vehicle compatible devices may be found in the following references, each of which is incorporated by reference herein in its entirety, and assigned to the assignee of the present invention. U.S. Pat. No. 7,378,945; U.S. Pat. No. 7,369,936; U.S. Pat. No. 7,224,083; U.S. Pat. No. 7,205,679; U.S. Pat. No. 7,091,822; U.S. Pat. No. 7,068,153; U.S. Pat. No. 7,046,126; U.S. Pat. No. 7,031,826; U.S. Pat. No. 7,010,402; U.S. Pat. No. 6,812,829; U.S. Pat. No. 6,756,886; U.S. Pat. No. 6,756,885; U.S. Pat. No. 6,529,124; and U.S. Pat. No. 6,346,876.

The vehicle remote climate controller 25 is coupled to the data communications bus 30 extending within the hybrid vehicle 21 for communication thereover to selectively operate the electrical heater 31 responsive to the sensor 33 and the remote transmitter 38. The vehicle remote climate controller 25 selectively operates the electrical heater 31 responsive to the sensor 33 and the remote transmitter 38.

The remote transmitter 38 may cause the vehicle remote climate controller 25 to heat the passenger compartment of the hybrid vehicle 21 to a pre-set temperature. Alternatively, the remote transmitter 38 may have buttons that enable a user to set the temperature to which the vehicle remote climate controller 25 is to heat the passenger compartment of the hybrid vehicle 21. Additionally or alternatively, the remote transmitter 38 may have buttons that enable a user to select to which of a plurality of pre-set temperatures the vehicle remote climate controller 25 is to heat the passenger compartment of the hybrid vehicle 21.

The remote transmitter 38 may be a small portable unit including a housing, function control switches carried by the housing, a battery within the housing, and the associated wireless transmitter circuitry also within the housing. The communications from the remote transmitter 38 to the receiver 22 at the vehicle is typically a direct radio frequency link. In other words, there are no intervening communications links. However, in other embodiments, the remote transmitter 38 may indirectly communicate with the receiver 22 via other communications infrastructure, such as via satellite, or cellular communications, via the public switched telephone network (PSTN) and/or over the World Wide Web or Internet, as will be appreciated by those skilled in the art.

The remote transmitter 38 may also include one or more central station transmitters, such as may be provided by a satellite transmitter or cellular telephone transmitter, for example. Such a central station transmitter may also be connected to other communications infrastructures. In some embodiments, the remote transmitter 38 may optionally include a remote receiver cooperating with a transmitter (not shown) at the vehicle, such as to provide status information to the user relating to a condition of the hybrid vehicle 21, for example the temperature of the passenger compartment.

The remote transmitter 38 may be a common remote transmitter. By common remote transmitter, it is meant that the remote transmitter 38 may operate a plurality of hybrid vehicles 21. Such a feature may be desirable to a driver who owns multiple hybrid vehicles 21 or to a rental car company, for example.

The vehicle remote climate controller 25 includes a central processing unit (CPU) 26 which performs the signal processing and logic functions to control operation of the electrical heater 31. The vehicle remote climate controller 25 also includes a bus interface 27 and a hardwire interface 28. The bus interface 27 includes circuitry for interfacing to the proper signal levels and formats on the data communications bus 30 as will be appreciated by those skilled in the art without further discussion herein.

In some applications, the hardwire interface 28 is to directly interface with the sensor 33, electrical heater 31, security circuit 34, and combustion engine starter 36. It should be understood that in these applications, one of the sensor 33, security circuit 34, electrical heater 31, and combustion engine starter 36 may each be directly connected to the hardwire interface 28, or that a plurality of the sensor, security circuit, electrical heater, and combustion engine starter, and may be directly connected to the hardwire interface.

As stated above, the vehicle remote climate controller 25 selectively operates the electrical heater 31 responsive to the sensor 33 and the remote transmitter 38. For example, the vehicle remote climate controller 25 may operate the electrical heater 31 if it receives, via the receiver 22, a signal from the remote transmitter 38 instructing it to do so.

If, during operation of the electrical heater 31, the sensor 33 senses that the voltage of the rechargeable battery 32 has fallen below a threshold voltage, the vehicle remote climate controller 25 may disable the electrical heater to conserve the voltage of the rechargeable battery. Similarly, if the vehicle remote climate controller 25 receives an instruction to activate the electrical heater 31, but the sensor 33 senses that the voltage of the rechargeable battery 32 is below a threshold voltage, the multi-vehicle compatible remote climate controller 20 may not activate the electrical heater. This feature helps to prevent excessive discharging of the rechargeable battery 32, due to operation of the heater 31, that might leave a driver stranded and the hybrid vehicle 21 inoperable.

If, during operation of the electrical heater 31, the sensor 33 senses that the voltage of the rechargeable battery 32 has fallen below a threshold voltage, the vehicle remote climate controller 25 may start the combustion engine 35. This may be done to charge the rechargeable battery 32 and to help prevent excessive discharging thereof.

If the vehicle remote climate controller 25 receives an instruction to activate the electrical heater 31, but the sensor 33 senses that the voltage of the rechargeable battery 32 is below a threshold voltage, the multi-vehicle compatible remote climate controller 20 may start the combustion engine 35 prior to operating the electrical heater 31.

In some applications, the vehicle remote climate controller 25 may sense if the shift selector of the hybrid vehicle 21 is in a position other than park and, if so, the multi-vehicle compatible remote climate controller may not start the combustion engine 35. Similarly, the vehicle remote climate controller 25 may sense whether the hood of the hybrid vehicle 21 is open and may not start the combustion engine 35 based thereupon. In addition, the vehicle remote climate controller 25 may shut down the combustion engine 25 if the engine RPM exceeds a predetermined value. Many other vehicle conditions, such as the fuel level of the hybrid vehicle 21, may be taken into account by the vehicle remote climate controller 25 before or during operation of the combustion engine 25 as will be appreciated by those skilled in the art. If the vehicle remote climate controller 25 elects to not start, or elects to shut down, the combustion engine 35 due to such a vehicle condition, it may instead deactivate the electrical heater 31.

The vehicle remote climate controller 25 may enable the electrical heater 31 based upon the sensor sensing the rechargeable battery 32 being coupled to an external power source 37. The external power source 37 may be an electrical socket, a recharging station, or other external power source as known to those skilled in the art.

In some applications, the hybrid vehicle may have a solar panel, such as on the roof thereof, coupled to the rechargeable battery 32. The vehicle remote climate controller 25 may enable the electrical heater 31 based upon the sensor sensing the rechargeable battery 32 being recharged by the solar panel.

Those of skill in the art will appreciate that the sensor 33 may also measure the current flowing in of or out of the rechargeable battery 32 and that the vehicle remote climate controller 25 may operate the electrical heater 31 based thereupon in the same manner as described above with reference to voltages of the rechargeable battery. Similarly, the sensor 33 may measure the temperature of the rechargeable battery 32 and the vehicle remote climate controller 25 may operate the electrical heater 31 based thereupon in the same manner as described above with reference to the voltage of the rechargeable battery.

Figure 2:
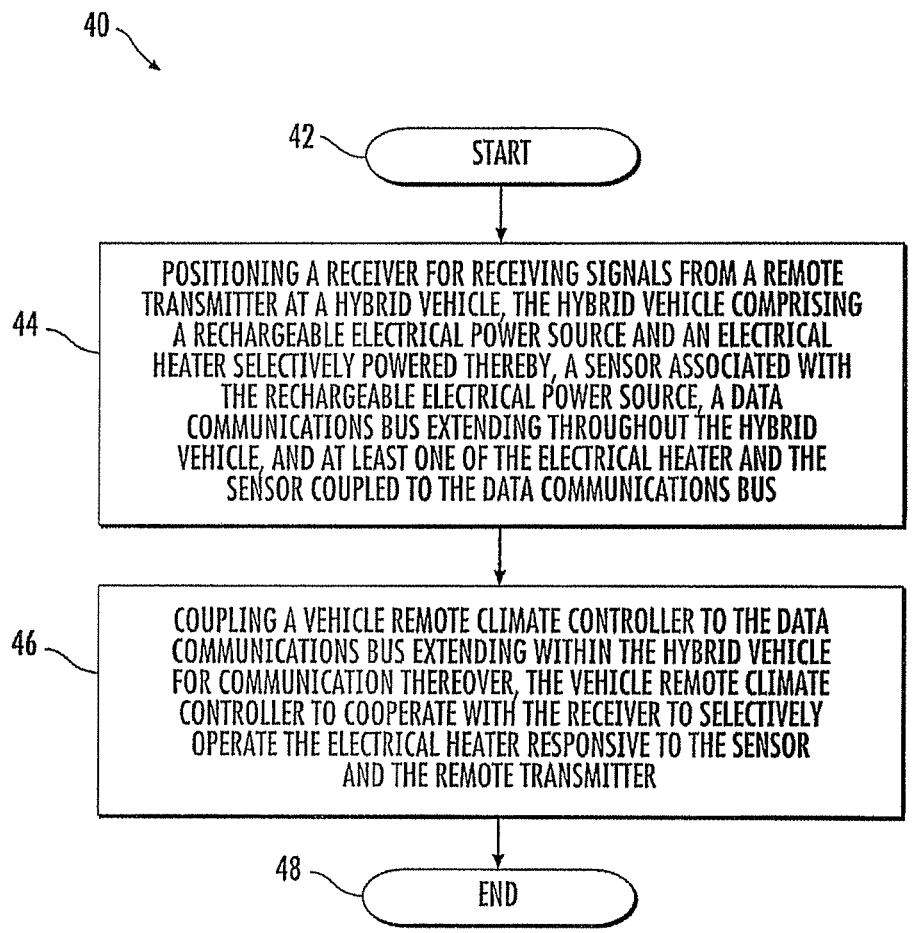
FIG. 2 is a flowchart of a method of installing the remote climate control system of FIG. 1 in a hybrid vehicle.

A method of installing a remote climate controller 25 in a hybrid vehicle 21 is now described with reference to the flowchart 40 of FIG. 2. After the start (Block 42), at Block 44 a receiver 22 for receiving signals from a remote transmitter 38 is positioned at a hybrid vehicle 21. The hybrid vehicle 21 comprises a rechargeable electrical power source 32 and an electrical heater 31 selectively powered thereby, a sensor 23 associated with the rechargeable electrical power source, and a data communications bus 30 extending throughout the hybrid vehicle. At least one of the electrical heater 31 and the sensor 33 is coupled to the data communications bus 30.

At Block 46 a vehicle remote climate controller 25 is coupled to the data communications bus 30 extending within the hybrid vehicle 21 for communication thereover. The vehicle remote climate controller 25 is to cooperate with the receiver 22 to selectively operate the electrical heater 31 responsive to the sensor 33 and the remote transmitter 38. Block 48 indicates the end of the method.

In other words, the method includes coupling a vehicle remote climate controller 25 to the data communications bus 30 extending within the hybrid vehicle 21 for communication thereover and the vehicle remote climate controller 25 is to cooperate with a receiver 22 to selectively operate the electrical heater 31 responsive to the sensor 33 and the remote transmitter 38.

The vehicle remote climate controller 25 may disable the electrical heater 31 based upon the sensor 33 sensing a voltage of the rechargeable electrical power source 32 being below a threshold. The hybrid vehicle 21 may have a combustion engine 35 and the vehicle remote climate controller 25 may start the combustion engine 35 based upon the sensor 33 sensing a voltage of the rechargeable electrical power source 32 being below a threshold.

The vehicle remote climate controller 35 may enable the electrical heater 31 based upon the sensor 33 sensing the rechargeable electrical power source 32 being coupled to an external power source 37. The vehicle remote climate controller 25 may comprise a multi-vehicle compatible remote climate controller.

Figure 3:
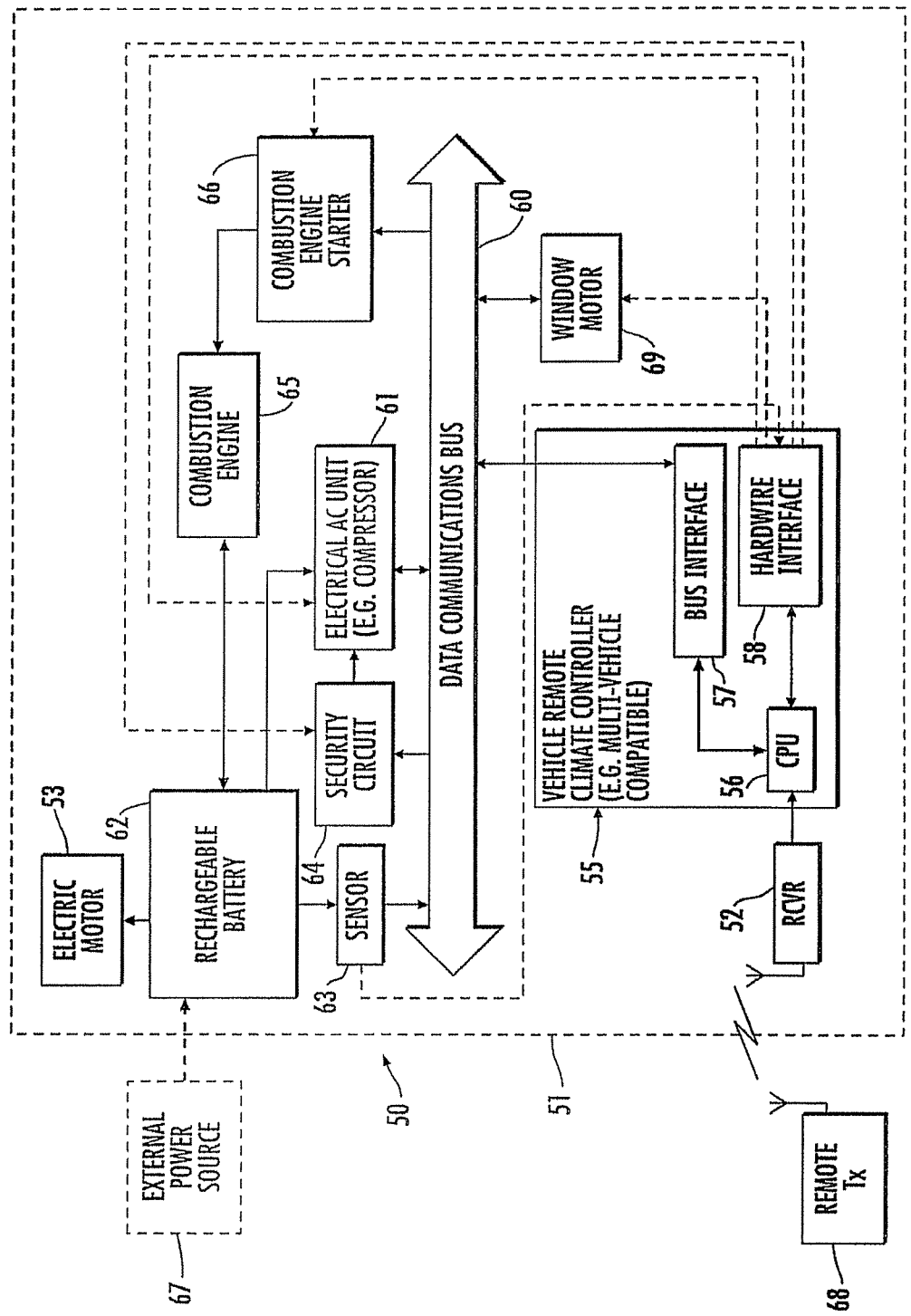
FIG. 3 is a schematic block diagram of an alternative embodiment of a remote climate control system for a hybrid vehicle in accordance with the present invention.

Referring now to FIG. 3, another embodiment of a remote climate control system 50 for a hybrid vehicle 51 is now described. The hybrid vehicle 51 has a rechargeable battery 62, although those of skill in the art will appreciate that the hybrid vehicle may have another rechargeable electrical power source, such as a capacitor or flywheel/generator, in addition to or instead of the rechargeable battery. The hybrid vehicle 51 has a combustion engine 65 that operates a generator or alternator (not shown) to recharge the rechargeable battery 62. The hybrid vehicle 51 also has an electric motor 53 that is coupled to the rechargeable battery 62. Those skilled in the art will appreciate that the hybrid vehicle 51 may have more than one electric motor 63. An optional separate combustion engine starter 66 starts the combustion engine. Those of skill in the art will understand that the combustion engine 65 may instead be started by the electric motor 53.

It should be understood that the combustion engine 65 may be an internal combustion engine that burns gasoline, diesel, ethanol, or other fuels. Rather than a combustion engine 65, the hybrid vehicle 51 may instead have an external heat engine, such as a Stirling engine.

The hybrid vehicle 51 further comprises an electrical air conditioning (AC) unit 61, for example an AC compressor, selectively powered by the rechargeable battery 62, a sensor 63 associated with the rechargeable battery, and an electric window motor 69. The electrical AC unit 61 may be a conventional AC compressor coupled to an electric motor via a belt or may be an AC compressor having an internal electric motor. In some embodiments, the electrical AC unit may be a thermoelectric cooler or other suitable electric AC unit as known to those of skill in the art.

The hybrid vehicle 51 may also include a security circuit 64 connected to the electrical AC unit 61. The security 64 circuit selectively disables the electrical AC unit 61. Those of skill in the art will appreciate that, in some applications, the security circuit 64 may also be connected to the combustion engine starter 66 to selectively disable the operation thereof and therefore the operation of the combustion engine 65. Indeed, in some applications, the security circuit 64 may selectively disable operation of a plurality of, or all of, the devices and functions of the hybrid vehicle 51. The security circuit 64 may be considered as an ignition switch of a conventional internal combustion engine vehicle.

The hybrid vehicle 51 has a data communications bus 60 extending throughout. The data communications bus 60 may extend through at least one of the engine compartment, the passenger compartment, and the trunk of the hybrid vehicle 51.

The sensor 63 is coupled to the rechargeable battery 62 and reads the voltage thereof. The sensor 63 may, additionally or alternatively, be able to detect whether the rechargeable battery is connected to an external power source 67. The external power source 67 may be an electrical socket or recharging station.

The electrical AC unit 61, the sensor 63, the security circuit 64, the combustion engine starter 66, and the window motor 69 are each coupled to the data communications bus 60 for communication thereover. Those of skill in the art will understand that each of the electrical AC unit 61, the sensor 63, the security circuit 64, the combustion engine starter 66, and the window motor 69 need not be on the data communications bus 60. Indeed, one of, or a plurality of, the electrical AC unit 61, the sensor 63, the security circuit 64, the combustion engine starter 66, and the window motor 69 may be on the data communications bus 60.

The remote climate control system 50 includes a remote transmitter 68 and a receiver 52 positioned at the hybrid vehicle 51 for receiving signals from the remote transmitter. The remote vehicle climate controller 55 may be a vehicle remote climate controller 55 to cooperate with the receiver 52. Those of skill in the art will understand that the receiver 52 and the vehicle remote climate controller 55 may be associated together in a same housing. In fact the receiver 52 and the vehicle remote climate controller 55 may each be embodied on a same printed circuit board or even in a same integrated circuit. The vehicle remote climate controller 55 bypasses the security circuit 64 to enable operation of the electrical AC unit 61. The security circuit 64 selectively disables the The vehicle remote climate controller 55 is coupled to the data communications bus 60 extending within the hybrid vehicle 51 for communication thereover to selectively operate the electrical AC unit 61 responsive to the sensor 63 and the remote transmitter 68. The vehicle remote climate controller 5S selectively operates the electrical AC unit 61 responsive to the sensor 63 and the remote transmitter 68.

The vehicle remote climate controller 55 may selectively operate the window motor 69 to assist cooling the passenger compartment of the hybrid vehicle 51. For example, the vehicle remote climate controller 55 may operate the window motor 69 to open the window during operation of the electrical AC unit 61. The hybrid vehicle 51 may have a rain sensor to detect precipitation. The rain sensor may be on the data bus 60. The vehicle remote climate controller 55 may communicate with the rain sensor through the data bus 60 or through the hardwire interface 58. If precipitation is detected, the vehicle remote climate controller 55 will not operate the window motor 69 to open the window. Similarly, if precipitation is detected while the window is open, the vehicle remote climate controller 55 will operate the window motor 69 to close the window.

The remote transmitter 68 may instruct the vehicle remote climate controller 55 to cool the passenger compartment of the hybrid vehicle 51 to a pre-set temperature. Alternatively, the remote transmitter 68 may have buttons that enable a user to set the temperature which the vehicle remote climate controller 55 is to cool the passenger compartment of the hybrid vehicle 51 to. Additionally or alternatively, the remote transmitter 68 may have buttons that enable a user to select which of a plurality of pre-set temperatures the vehicle remote climate controller 55 is to cool the passenger compartment of the hybrid vehicle 51 to.

The remote transmitter 68 may be a small portable unit including a housing, function control switches carried by the housing, a battery within the housing, and the associated wireless transmitter circuitry also within the housing. The communications from the remote transmitter 68 to the receiver 52 at the vehicle is typically a direct radio frequency link. In other words, there are no intervening communications links. However, in other embodiments, the remote transmitter 68 may indirectly communicate with the receiver 52 via other communications infrastructure, such as via satellite, or cellular communications, via the public switched telephone network (PSTN) and/or over the World Wide Web or Internet, as will be appreciated by those skilled in the art.

The remote transmitter 68 may also include one or more central station transmitters, such as may be provided by a satellite transmitter or cellular telephone transmitter, for example. Such a central station transmitter may also be connected to other communications infrastructures. In some embodiments, the remote transmitter 68 may optionally include a remote receiver (not shown), such as to provide status information to the user relating to the temperature of the passenger compartment of the hybrid vehicle 51.

The remote transmitter 68 may be a common remote transmitter. By common remote transmitter, it is meant that the remote transmitter 68 may operate a plurality of hybrid vehicles 51. Such a feature may be desirable to a driver who owns multiple hybrid vehicles 51 or to a rental car company, for example.

The vehicle remote climate controller 55 includes a central processing unit (CPU) 56 which performs the signal processing and logic functions to control operation of the electrical AC unit 61. The vehicle remote climate controller 55 also includes a bus interface 57 and a hardwire interface 58. The bus interface 57 includes circuitry for interfacing to the proper signal levels and formats on the data communications bus 60 as will be appreciated by those skilled in the art without further discussion herein.

In some applications, the hardwire interface 58 is to directly interface with the sensor 63, electrical AC unit 61, security circuit 64, combustion engine starter 66, and window motor 69. It should be understood that in these applications, one of the sensor 63, security circuit 64, electrical AC unit 61, combustion engine starter 66, and window motor 69 may each be directly connected to the hardwire interface 58, or that a plurality of the sensor, security circuit, electrical heater, combustion engine starter, and window motor may be directly connected to the hardwire interface.

As stated above, the vehicle remote climate controller 55 selectively operates the electrical AC unit 61 responsive to the sensor 63 and the remote transmitter 68. For example, the vehicle remote climate controller 55 may operate the electrical AC unit 61 if it receives, via the receiver 52, a signal from the remote transmitter 68 instructing it to do so.

If, during operation of the electrical AC unit 61, the sensor 63 senses that the voltage of the rechargeable battery 62 has fallen below a threshold voltage, the vehicle remote climate controller 55 may disable the electrical AC unit to conserve the voltage of the rechargeable battery. Similarly, if the vehicle remote climate controller 25 receives an instruction to activate the electrical AC unit 61, but the sensor 63 senses that the voltage of the rechargeable battery 62 is below a threshold voltage, the vehicle remote climate controller 55 may not activate the electrical AC unit. This feature helps to prevent excessive discharging of the rechargeable battery 62, due to operation of the electrical AC unit 61, that might leave a driver stranded and the hybrid vehicle 51 inoperable.

If, during operation of the electrical AC unit 61, the sensor 63 senses that the voltage of the rechargeable battery 62 has fallen below a threshold voltage, the vehicle remote climate controller 55 may start the combustion engine 65. This may be done to charge the rechargeable battery 62 and to help prevent excessive discharging thereof.

If the vehicle remote climate controller 55 receives an instruction to activate the electrical AC unit 61, but the sensor 63 senses that the voltage of the rechargeable battery 62 is below a threshold voltage, the vehicle remote climate controller 55 may start the combustion engine 65 prior to operating the electrical AC unit 61.

In some applications, the vehicle remote climate controller 55 may sense if the shift selector of the hybrid vehicle 51 is in a position other than park and, if so, the multi-vehicle compatible remote climate controller may not start the combustion engine 65. Similarly, the vehicle remote climate controller 55 may sense whether the hood of the hybrid vehicle 51 is open and may not start the combustion engine 65 based thereupon. In addition, the vehicle remote climate controller 55 may shut down the combustion engine 65 if the engine RPM exceeds a predetermined value. Many other vehicle conditions, such as the fuel level of the hybrid vehicle 51, may be taken into account by the vehicle remote climate controller 55 before or during operation of the combustion engine 65 as will be appreciated by those skilled in the art. If the vehicle remote climate controller 55 elects to not start, or elects to shut down, the combustion engine 65 due to such a vehicle condition, it may instead deactivate the electrical AC unit 61.

The vehicle remote climate controller 55 may enable the electrical AC unit 61 based upon the sensor sensing the rechargeable battery 62 being coupled to an external power source 67. The external power source 67 may be an electrical socket, a recharging station, or other external power source as known to those skilled in the art.

In some applications, the hybrid vehicle may have a solar panel, such as on the roof thereof, coupled to the rechargeable battery 62. The vehicle remote climate controller 55 may enable the electrical AC unit 61 based upon the sensor sensing the rechargeable battery 62 being recharged by the solar panel.

Those of skill in the art will appreciate that the sensor 63 may also measure the current flowing in of or out of the rechargeable battery 62 and that the vehicle remote climate controller 55 may operate the electrical AC unit 61 based thereupon in the same manner as described above with reference to voltages of the rechargeable battery. Similarly, the sensor 63 may measure the temperature of the rechargeable battery 62 and the vehicle remote climate controller 55 may operate the electrical AC unit 61 based thereupon in the same manner as described above with reference to the voltage of the rechargeable battery.

Figure 4:
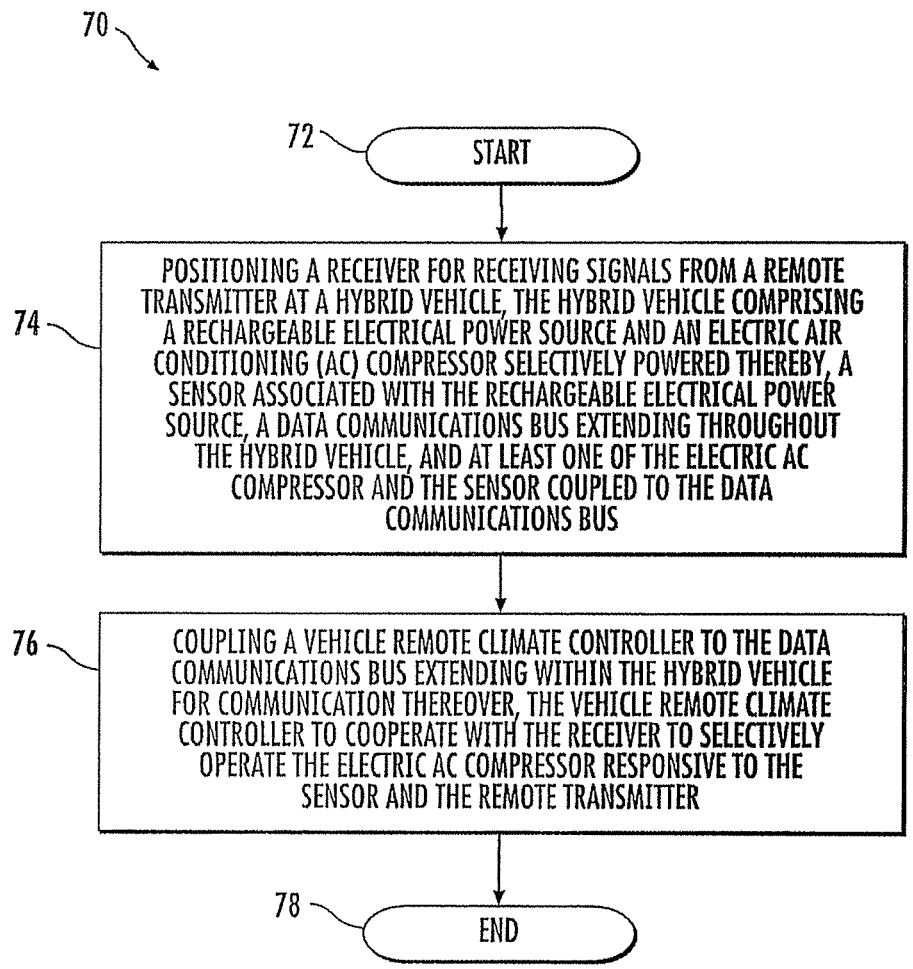
FIG. 4 is a flowchart of a method of installing the remote climate control system of FIG. 3 in a hybrid vehicle.

A method of installing a remote climate controller 55 in a hybrid vehicle 51 is now described with reference to the flowchart 70 of FIG. 4. After the start (Block 72), at Block 74 a receiver 52 for receiving signals from a remote transmitter 68 is positioned at a hybrid vehicle 51. The hybrid vehicle 51 comprises a rechargeable electrical power source 32 and an electrical AC unit 61 selectively powered thereby, a sensor 63 associated with the rechargeable electrical power source, and a data communications bus 60 extending throughout the hybrid vehicle. At least one of the electrical AC unit 61 and the sensor 63 is coupled to the data communications bus 60.

At Block 76 a vehicle remote climate controller 55 is coupled to the data communications bus 60 extending within the hybrid vehicle 51 for communication thereover. The vehicle remote climate controller 55 is to cooperate with the receiver 52 to selectively operate the electrical AC unit 61 responsive to the sensor 63 and the remote transmitter 68. Block 78 indicates the end of the method.

In other words, the method includes coupling a vehicle remote climate controller 55 to the data communications bus 60 extending within the hybrid vehicle 51 for communication thereover, the vehicle remote climate controller 55 to cooperate with a receiver 52 to selectively operate the electrical AC unit 61 responsive to the sensor 63 and the remote transmitter 68.

The vehicle remote climate controller 55 may disable the electrical AC unit 61 based upon the sensor 63 sensing a voltage of the rechargeable electrical power source 62 being below a threshold. The hybrid vehicle 51 may have a combustion engine 65 and the vehicle remote climate controller 55 may start the combustion engine 65 based upon the sensor 63 sensing a voltage of the rechargeable electrical power source 62 being below a threshold.

The vehicle remote climate controller 55 may enable the electrical AC unit 61 based upon the sensor 63 sensing the rechargeable electrical power source 62 being coupled to an external power source 67. The vehicle remote climate controller 55 may comprise a multi-vehicle compatible remote climate controller.

Figure 5:
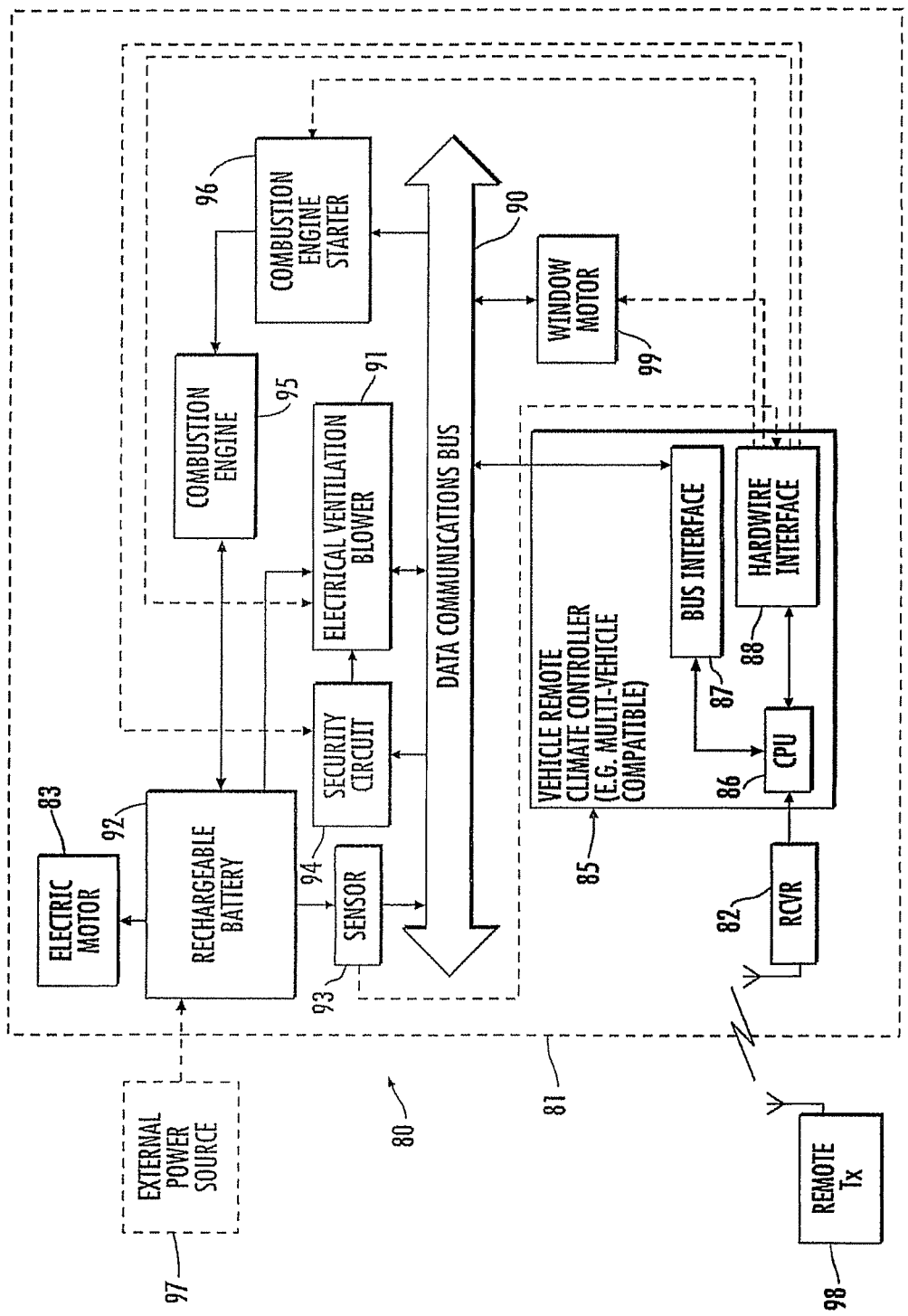
FIG. 5 is a schematic block diagram of a further embodiment of a remote climate control system for a hybrid vehicle in accordance with the present invention.

Referring now to FIG. 5, yet another embodiment of a remote climate control system 80 for a hybrid vehicle 81 is now described. The hybrid vehicle 81 has a rechargeable battery 92, although those of skill in the art will appreciate that the hybrid vehicle may have another rechargeable electrical power source, such as a capacitor or flywheel/generator, in addition to or instead of the rechargeable battery. The hybrid vehicle 81 has a combustion engine 95 that operates a generator or alternator (not shown) to recharge the rechargeable battery 92. The hybrid vehicle 81 also has an electric motor 83 coupled to the rechargeable battery 92. An optional separate combustion engine starter 96 starts the combustion engine. Those of skill in the art will understand that the combustion engine 95 may instead be started by the electric motor 83.

It should be understood that the combustion engine 95 may be an internal combustion engine that burns gasoline, diesel, ethanol, or other fuels. Rather than a combustion engine 95, the hybrid vehicle 81 may instead have an external heat engine, such as a Stirling engine.

The hybrid vehicle 81 further comprises an electrical ventilation blower 91 selectively powered by the rechargeable battery 92, a sensor 93 associated with the rechargeable battery, and an electric window motor 99. The electrical ventilation blower 91 may be a conventional blower coupled to an electric motor via a belt or may be a blower having an internal electric motor. It should be understood that the electric blower 91 merely blows ambient outside air into the passenger compartment of the vehicle and does not actively cool the air, as would an electric AC unit. It may be advantageous to use the electrical ventilation blower 91 to cool the passenger compartment of the hybrid vehicle 81 as opposed to an electrical AC unit because the electrical ventilation blower may consume less electricity than an electrical AC unit.

The hybrid vehicle 81 may also include a security circuit 94 connected to the electrical ventilation blower 91. The security circuit 94 selectively disables the electrical ventilation blower 91. Those of skill in the art will appreciate that, in some applications, the security circuit 94 may also be connected to the combustion engine starter 96 to selectively disable the operation thereof and therefore the operation of the combustion engine 95. Indeed, in some applications, the security circuit 94 may selectively disable operation of a plurality of, or all of, the devices and functions of the hybrid vehicle 81. The security circuit 94 may not be considered as an ignition switch of a conventional internal combustion engine vehicle.

The hybrid vehicle 81 has a data communications bus 90 extending throughout. The data communications bus 90 may extend through at least one of the engine compartment, the passenger compartment, and the trunk of the hybrid vehicle 81.

The sensor 93 is coupled to the rechargeable battery 92 and reads the voltage thereof. The sensor 93 may, additionally or alternatively, be able to detect whether the rechargeable battery is connected to an external power source 97. The external power source 97 may be an electrical socket or recharging station.

The electrical ventilation blower 91, the sensor 93, the security circuit 94, the combustion engine starter 96, and the window motor 99 are each coupled to the data communications bus 90 for communication thereover. Those of skill in the art will understand that each of the electrical ventilation blower 91, the sensor 93, the security circuit 94, the combustion engine starter 96, and the window motor 99 need not be on the data communications bus 90. Indeed, one of, or a plurality of, the electrical ventilation blower 91, the sensor 93, the security circuit 94, the combustion engine starter 96, and the window motor 99 may be on the data communications bus 90.

The remote climate control system 80 includes a remote transmitter 98 and a receiver 82 positioned at the hybrid vehicle 81 for receiving signals from the remote transmitter. The remote vehicle climate controller 85 may be a vehicle remote climate controller 85 to cooperate with the receiver 82. Those of skill in the art will understand that the receiver 82 and the vehicle remote climate controller 85 may be associated together in a same housing. In fact the receiver 82 and the vehicle remote climate controller 85 may each be embodied on a same printed circuit board or even in a same integrated circuit. The vehicle remote climate controller 85 bypasses the security circuit 94 to enable operation of the electrical ventilation blower 91.

The vehicle remote climate controller 85 is coupled to the data communications bus 90 extending within the hybrid vehicle 81 for communication thereover to selectively operate the electrical ventilation blower 91 responsive to the sensor 93 and the remote transmitter 98. The vehicle remote climate controller 85 selectively operates the electrical ventilation blower 91 responsive to the sensor 93 and the remote transmitter 98.

The vehicle remote climate controller 85 may selectively operate the window motor 99 to assist cooling the passenger compartment of the hybrid vehicle 81. For example, the vehicle remote climate controller 85 may operate the window motor 99 to open the window during operation of the electrical ventilation blower 91. The hybrid vehicle 81 may have a rain sensor to detect precipitation. The rain sensor may be on the data bus 90. The vehicle remote climate controller 85 may communicate with the rain sensor through the data bus 90 or through the hardwire interface 88. If precipitation is detected, the vehicle remote climate controller 85 will not operate the window motor 99 to open the window. Similarly, if precipitation is detected while the window is open, the vehicle remote climate controller 85 will operate the window motor 99 to close the window.

The remote transmitter 98 may cause the vehicle remote climate controller 85 to cool the passenger compartment of the hybrid vehicle 81 to a pre-set temperature. Alternatively, the remote transmitter 98 may have buttons that enable a user to set the temperature which the vehicle remote climate controller 85 is to cool the passenger compartment of the hybrid vehicle 81 to. Additionally or alternatively, the remote transmitter 98 may have buttons that enable a user to select which of a plurality of pre-set temperatures the vehicle remote climate controller 85 is to cool the passenger compartment of the hybrid vehicle 81 to.

In some applications, the vehicle remote climate controller 25 may be programmable to cool the passenger compartment of the hybrid vehicle 81 to a pre-set temperature at pre-set times. For example, the vehicle remote climate controller 25 may be set to cool the passenger compartment to 70° C. at 5:00 PM on Monday through Friday.

The remote transmitter 98 may be a small portable unit including a housing, function control switches carried by the housing, a battery within the housing, and the associated wireless transmitter circuitry also within the housing. The communications from the remote transmitter 98 to the receiver 82 at the vehicle is typically a direct radio frequency link. In other words, there are no intervening communications links. However, in other embodiments, the remote transmitter 98 may indirectly communicate with the receiver 82 via other communications infrastructure, such as via satellite, or cellular communications, via the public switched telephone network (PSTN) and/or over the World Wide Web or Internet, as will be appreciated by those skilled in the art.

The remote transmitter 98 may also include one or more central station transmitters, such as may be provided by a satellite transmitter or cellular telephone transmitter, for example. Such a central station transmitter may also be connected to other communications infrastructures. In some embodiments, the remote transmitter 98 may optionally include a remote receiver (not shown), such as to provide status information to the user relating to the temperature of the passenger compartment of the hybrid vehicle 81.

The remote transmitter 98 may be a common remote transmitter. By common remote transmitter, it is meant that the remote transmitter 98 may operate a plurality of hybrid vehicles 81. Such a feature may be desirable to a driver who owns multiple hybrid vehicles 81 or to a rental car company, for example.

The remote vehicle climate controller 85 includes a central processing unit (CPU) 86 which performs the signal processing and logic functions to control operation of the electrical ventilation blower 91. The vehicle remote climate controller 85 also includes a bus interface 87 and a hardwire interface 88. The bus interface 87 includes circuitry for interfacing to the proper signal levels and formats on the data communications bus 90 as will be appreciated by those skilled in the art without further discussion herein.

In some applications, the hardwire interface 88 is to directly interface with the sensor 93, electrical ventilation blower 91, security circuit 94, combustion engine starter 96, and window motor 99. It should be understood that in these applications, one of the sensor 93, security circuit 94, electrical ventilation blower 91, combustion engine starter 96, and window motor 99 may each be directly connected to the hardwire interface 88, or that a plurality of the sensor, security circuit, electrical heater, combustion engine starter, and window motor may be directly connected to the hardwire interface.

As stated above, the vehicle remote climate controller 85 selectively operates the electrical ventilation blower 91 responsive to the sensor 93 and the remote transmitter 98. For example, the vehicle remote climate controller 85 may operate the electrical ventilation blower 91 if it receives, via the receiver 82, a signal from the remote transmitter 98 causing it to do so.

If, during operation of the electrical ventilation blower 91, the sensor 93 senses that the voltage of the rechargeable battery 92 has fallen below a threshold voltage, the vehicle remote climate controller 85 may disable the electrical ventilation blower to conserve the voltage of the rechargeable battery. Similarly, if the vehicle remote climate controller 25 receives an instruction to activate the electrical ventilation blower 91, but the sensor 93 senses that the voltage of the rechargeable battery 92 is below a threshold voltage, the vehicle remote climate controller 85 may not activate the electrical ventilation blower. This feature helps to prevent excessive discharging of the rechargeable battery 92, due to operation of the electrical ventilation blower 91, that might leave a driver stranded and the hybrid vehicle 81 inoperable.

If, during operation of the electrical ventilation blower 91, the sensor 93 senses that the voltage of the rechargeable battery 92 has fallen below a threshold voltage, the vehicle remote climate controller 85 may start the combustion engine 95. This may be done to charge the rechargeable battery 92 and to help prevent excessive discharging thereof.

If the vehicle remote climate controller 85 receives an instruction to activate the electrical ventilation blower 91, but the sensor 93 senses that the voltage of the rechargeable battery 92 is below a threshold voltage, the vehicle remote climate controller 85 may start the combustion engine 95 prior to operating the electrical ventilation blower 91.

In some applications, the vehicle remote climate controller 25 may sense if the shift selector of the hybrid vehicle 81 is in a position other than park and, if so, the multi-vehicle compatible remote climate controller may not start the combustion engine 95. Similarly, the vehicle remote climate controller 85 may sense whether the hood of the hybrid vehicle 81 is open and may not start the combustion engine 95 based thereupon. In addition, the vehicle remote climate controller 85 may shut down the combustion engine 95 if the engine RPM exceeds a predetermined value. Many other vehicle conditions, such as the fuel level of the hybrid vehicle 81, may be taken into account by the vehicle remote climate controller 85 before or during operation of the combustion engine 95 as will be appreciated by those skilled in the art. If the vehicle remote climate controller 85 elects to not start, or elects to shut down, the combustion engine 95 due to such a vehicle condition, it may instead deactivate the electrical ventilation blower 91.

The vehicle remote climate controller 85 may enable the electrical ventilation blower 91 based upon the sensor sensing the rechargeable battery 92 being coupled to an external power source 97. The external power source 97 may be an electrical socket, a recharging station, or other external power source as known to those skilled in the art.

In some applications, the hybrid vehicle may have a solar panel, such as on the roof thereof, coupled to the rechargeable battery 92. The vehicle remote climate controller 85 may enable the electrical ventilation blower 91 based upon the sensor sensing the rechargeable battery 92 being recharged by the solar panel.

Those of skill in the art will appreciate that the sensor 93 may also measure the current flowing in of or out of the rechargeable battery 92 and that the vehicle remote climate controller 85 may operate the electrical ventilation blower 91 based thereupon in the same manner as described above with reference to voltages of the rechargeable battery. Similarly, the sensor 93 may measure the temperature of the rechargeable battery 92 and the vehicle remote climate controller 85 may operate the electrical ventilation blower 91 based thereupon in the same manner as described above with reference to the voltage of the rechargeable battery.

Figure 6:
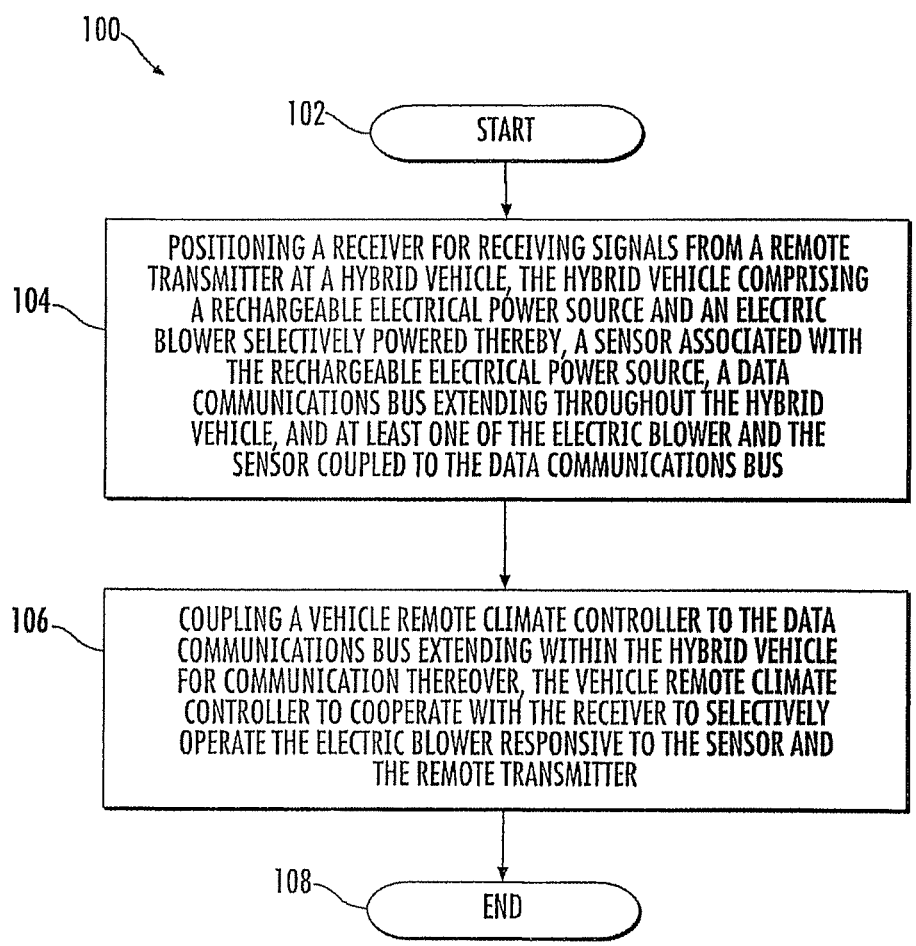
FIG. 6 is a flowchart of a method of installing the remote climate control system of FIG. 6 in a hybrid vehicle.

A method of installing a remote climate controller 85 in a hybrid vehicle 81 is now described with reference to the flowchart 100 of FIG. 6. After the start (Block 102), at Block 104 a receiver 82 for receiving signals from a remote transmitter 98 is positioned at a hybrid vehicle 81. The hybrid vehicle 81 comprises a rechargeable electrical power source 32 and an electrical ventilation blower 91 selectively powered thereby, a sensor 93 associated with the rechargeable electrical power source, and a data communications bus 90 extending throughout the hybrid vehicle. At least one of the electrical ventilation blower 91 and the sensor 93 is coupled to the data communications bus 90.

At Block 106 a vehicle remote climate controller 85 is coupled to the data communications bus 90 extending within the hybrid vehicle 81 for communication thereover. The vehicle remote climate controller 85 is to cooperate with the receiver 82 to selectively operate the electrical ventilation blower 91 responsive to the sensor 93 and the remote transmitter 98. Block 108 indicates the end of the method.

In other words, the method includes coupling a vehicle remote climate controller 85 to the data communications bus 90 extending within the hybrid vehicle 81 for communication thereover, the vehicle remote climate controller 85 to cooperate with a receiver 82 to selectively operate the electrical ventilation blower 91 responsive to the sensor 93 and the remote transmitter 98.

The vehicle remote climate controller 85 may disable the electrical ventilation blower 91 based upon the sensor 93 sensing a voltage of the rechargeable electrical power source 92 being below a threshold. The hybrid vehicle 81 may have a combustion engine 95 and the vehicle remote climate controller 85 may start the combustion engine 95 based upon the sensor 93 sensing a voltage of the rechargeable electrical power source 92 being below a threshold.

The vehicle remote climate controller 85 may enable the electrical ventilation blower 91 based upon the sensor 93 sensing the rechargeable electrical power source 92 being coupled to an external power source 97. The vehicle remote climate controller 85 may comprise a multi-vehicle compatible remote climate controller.

Figure 7:
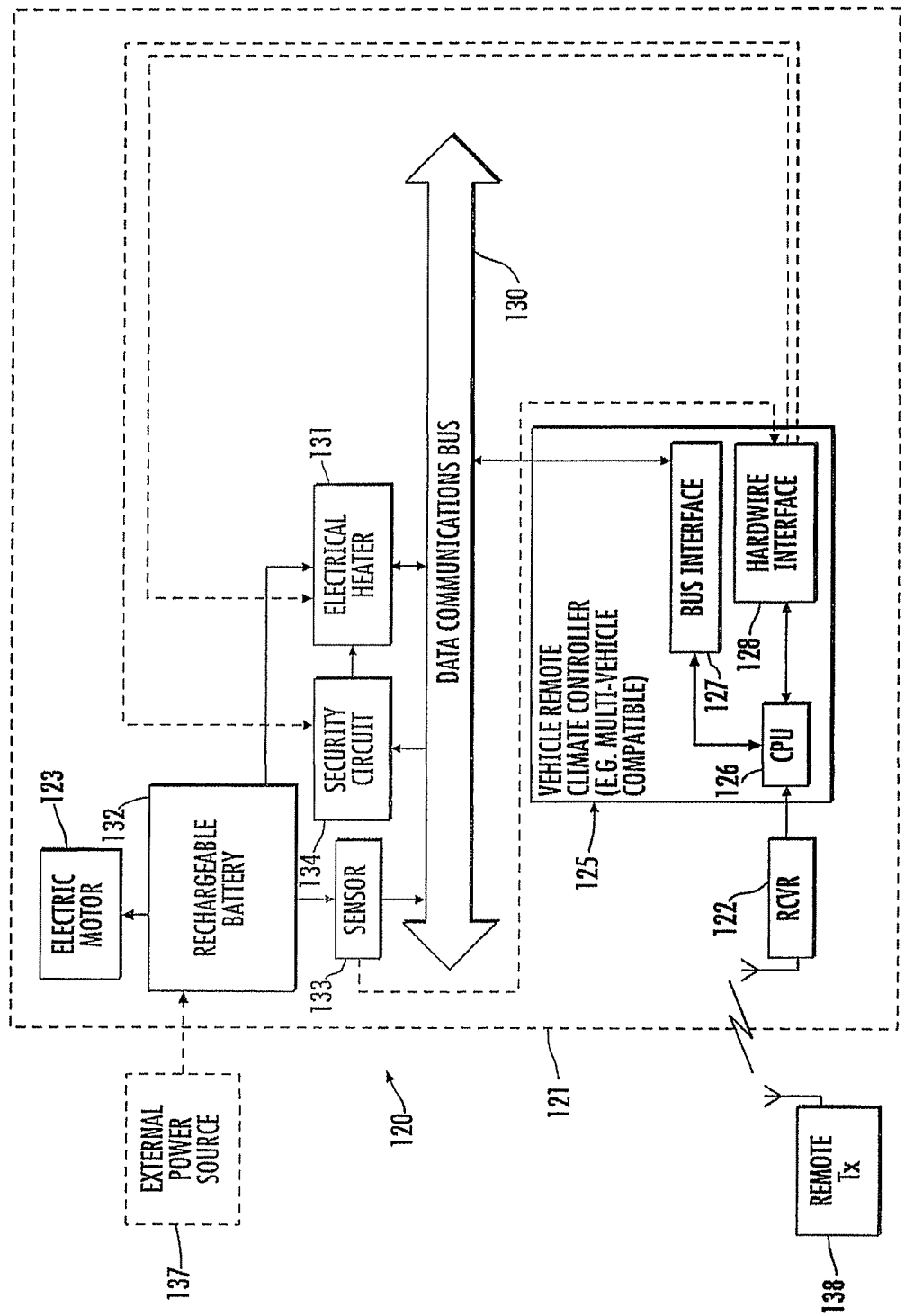
FIG. 7 is a schematic block diagram of a remote climate control system for an electric vehicle in accordance with the present invention.
Figure 8:
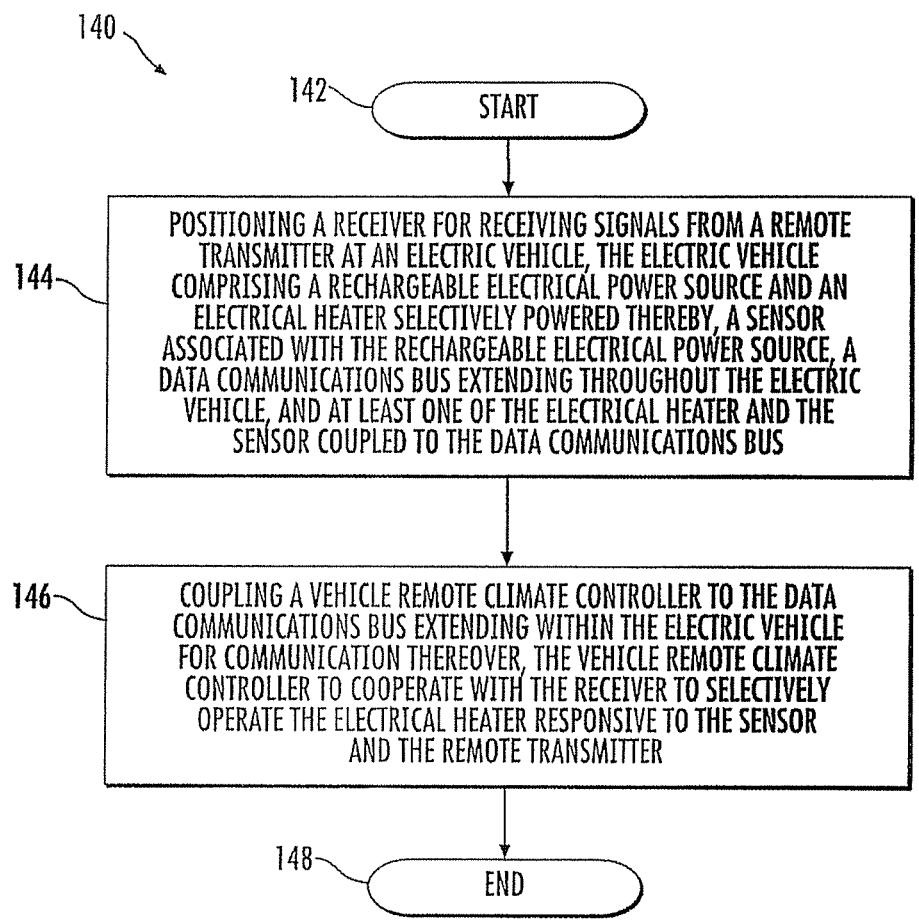
FIG. 8 is a flowchart of a method of installing the remote climate control system of FIG. 7 in an electric vehicle.

Referring now to FIG. 7, a remote climate control system 120 for an electric vehicle 121 is now described. The electric vehicle 121 has a rechargeable battery 132, although those of skill in the art will appreciate that the electric vehicle may have another rechargeable electrical power source, such as a capacitor, fuel cell, or flywheel/generator, in addition to or instead of the rechargeable battery. The electric vehicle 121 also has an electric motor 123 coupled to the rechargeable battery 132.

The electric vehicle 121 further comprises an electrical heater 131 selectively powered by the rechargeable battery 132 and a sensor 133 associated with the rechargeable battery. The electrical heater 131 may be a resistive heater or other suitable heater as known to those of skill in the art.

The electric vehicle 121 may also include a security circuit 134 connected to the electrical heater 131. The security circuit 134 selectively disables the electrical heater 131. Those of skill in the art will appreciate that, in some applications, the security circuit 134 may selectively disable operation of a plurality of, or all of, the devices and functions of the electric vehicle 121. The security circuit 134 may be considered as an ignition switch of a conventional internal combustion engine vehicle.

The electric vehicle 121 has a data communications bus 130 extending throughout. The data communications bus 130 may extend through at least one of the engine compartment, the passenger compartment, and the trunk of the electric vehicle 121.

The sensor 133 is coupled to the rechargeable battery 132 and reads the voltage thereof. The sensor 133 may, additionally or alternatively, be able to detect whether the rechargeable battery is connected to an external power source 137. The external power source 137 may be an electrical socket or recharging station.

The electrical heater 131, the sensor 133, the security circuit 134, and the combustion engine starter 36 are each coupled to the data communications bus 130 for communication thereover. Those of skill in the art will understand that each of the electrical heater 131, the sensor 133, and the security circuit 134 need not be on the data communications bus 130. Indeed, one of, or a plurality of the electrical heater 131, the sensor 133, and the security circuit 134 may be on the data communications bus 130.

The remote climate control system 120 includes a remote transmitter 138 and a receiver 122 positioned at the electric vehicle 121 for receiving signals from the remote transmitter. The remote climate control system 120 also includes a vehicle remote climate controller 125 to cooperate with the receiver 122. Those of skill in the art will understand that the receiver 122 and the vehicle remote climate controller 125 may be associated together in a same housing. In fact the receiver 122 and the vehicle remote climate controller 125 may each be embodied on a same printed circuit board or even in a same integrated circuit.

The vehicle remote climate controller 125 bypasses the security circuit 134 to enable operation of the electrical heater 131. The security circuit 134 selectively disables the electrical heater 131.

The vehicle remote climate controller 125 is coupled to the data communications bus 130 extending within the electric vehicle 121 for communication thereover to selectively operate the electrical heater 131 responsive to the sensor 133 and the remote transmitter 138. The vehicle remote climate controller 125 selectively operates the electrical heater 131 responsive to the sensor 133 and the remote transmitter 138.

The remote transmitter 138 may cause the vehicle remote climate controller 125 to heat the passenger compartment of the electric vehicle 121 to a pre-set temperature. Alternatively, the remote transmitter 138 may have buttons that enable a user to set the temperature which the vehicle remote climate controller 125 is to heat the passenger compartment of the electric vehicle 121 to. Additionally or alternatively, the remote transmitter 138 may have buttons that enable a user to select which of a plurality of pre-set temperatures the vehicle remote climate controller 125 is to heat the passenger compartment of the electric vehicle 121 to.

The remote transmitter 138 may be a small portable unit including a housing, function control switches carried by the housing, a battery within the housing, and the associated wireless transmitter circuitry also within the housing. The communications from the remote transmitter 138 to the receiver 122 at the vehicle is typically a direct radio frequency link. In other words, there are no intervening communications links. However, in other embodiments, the remote transmitter 138 may indirectly communicate with the receiver 122 via other communications infrastructure, such as via satellite, or cellular communications, via the public switched telephone network (PSTN) and/or over the World Wide Web or Internet, as will be appreciated by those skilled in the art.

The remote transmitter 138 may also include one or more central station transmitters, such as may be provided by a satellite transmitter or cellular telephone transmitter, for example. Such a central station transmitter may also be connected to other communications infrastructures. In some embodiments, the remote transmitter 138 may optionally include a remote receiver (not shown), such as to provide status information to the user relating to the temperature of the passenger compartment of the electric vehicle 121.

The remote transmitter 138 may be a common remote transmitter. By common remote transmitter, it is meant that the remote transmitter 138 may operate a plurality of electric vehicles 121. Such a feature may be desirable to a driver who owns multiple electric vehicles 121 or to a rental car company, for example.

The vehicle remote climate controller 125 includes a central processing unit (CPU) 126 which performs the signal processing and logic functions to control operation of the electrical heater 131. The vehicle remote climate controller 125 also includes a bus interface 127 and a hardwire interface 128. The bus interface 127 includes circuitry for interfacing to the proper signal levels and formats on the data communications bus 130 as will be appreciated by those skilled in the art without further discussion herein.

In some applications, the hardwire interface 128 is to directly interface with the sensor 133, electrical heater 131, and security circuit 134. It should be understood that in these applications, one of the sensor 133, security circuit 134, and electrical heater 131 may each be directly connected to the hardwire interface 128, or that a plurality of the sensor, security circuit, and electrical heater may be directly connected to the hardwire interface.

As stated above, the vehicle remote climate controller 125 selectively operates the electrical heater 131 responsive to the sensor 133 and the remote transmitter 138. For example, the vehicle remote climate controller 125 may operate the electrical heater 131 if it receives, via the receiver 122, a signal from the remote transmitter 138 causing it to do so.

If, during operation of the electrical heater 131, the sensor 133 senses that the voltage of the rechargeable battery 132 has fallen below a threshold voltage, the vehicle remote climate controller 125 may disable the electrical heater to conserve the voltage of the rechargeable battery. Similarly, if the vehicle remote climate controller 125 receives an instruction to activate the electrical heater 131, but the sensor 133 senses that the voltage of the rechargeable battery 132 is below a threshold voltage, the multi-vehicle compatible remote climate controller 120 may not activate the electrical heater. This feature helps to prevent excessive discharging of the rechargeable battery 132, due to operation of the heater 131, that might leave a driver stranded and the electric vehicle 121 inoperable.

The vehicle remote climate controller 125 may enable the electrical heater 131 based upon the sensor sensing the rechargeable battery 132 being coupled to an external power source 137. The external power source 137 may be an electrical socket, a recharging station, or other external power source as known to those skilled in the art.

In some applications, the electric vehicle may have a solar panel, such as on the roof thereof, coupled to the rechargeable battery 132. The vehicle remote climate controller 125 may enable the electrical heater 131 based upon the sensor sensing the rechargeable battery 132 being recharged by the solar panel.

Those of skill in the art will appreciate that the sensor 133 may also measure the current flowing in of or out of the rechargeable battery 132 and that the vehicle remote climate controller 125 may operate the electrical heater 131 based thereupon in the same manner as described above with reference to voltages of the rechargeable battery. Similarly, the sensor 133 may measure the temperature of the rechargeable battery 132 and the vehicle remote climate controller 125 may operate the electrical heater 131 based thereupon in the same manner as described above with reference to the voltage of the rechargeable battery.

A method of installing a remote climate controller 125 in a electric vehicle 121 is now described with reference to the flowchart 140 of FIG. 2. After the start (Block 142), at Block 144 a receiver 122 for receiving signals from a remote transmitter 138 is positioned at an electric vehicle 121. The electric vehicle 121 comprises a rechargeable electrical power source 132 and an electrical heater 131 selectively powered thereby, a sensor 123 associated with the rechargeable electrical power source, and a data communications bus 130 extending throughout the electric vehicle. At least one of the electrical heater 131 and the sensor 133 is coupled to the data communications bus 130.

At Block 146 a vehicle remote climate controller 125 is coupled to the data communications bus 130 extending within the electric vehicle 121 for communication thereover. The vehicle remote climate controller 125 is to cooperate with the receiver 122 to selectively operate the electrical heater 131 responsive to the sensor 133 and the remote transmitter 138. Block 148 indicates the end of the method.

In other words, the method includes coupling a vehicle remote climate controller 125 to the data communications bus 130 extending within the electric vehicle 121 for communication thereover, the vehicle remote climate controller 125 to cooperate with a receiver 122 to selectively operate the electrical heater 131 responsive to the sensor 133 and the remote transmitter 138.

The vehicle remote climate controller 125 may disable the electrical heater 131 based upon the sensor 133 sensing a voltage of the rechargeable electrical power source 132 being below a threshold.

The vehicle remote climate controller 135 may enable the electrical heater 131 based upon the sensor 133 sensing the rechargeable electrical power source 132 being coupled to an external power source 137. The vehicle remote climate controller 125 may comprise a multi-vehicle compatible remote climate controller.

Figure 9:
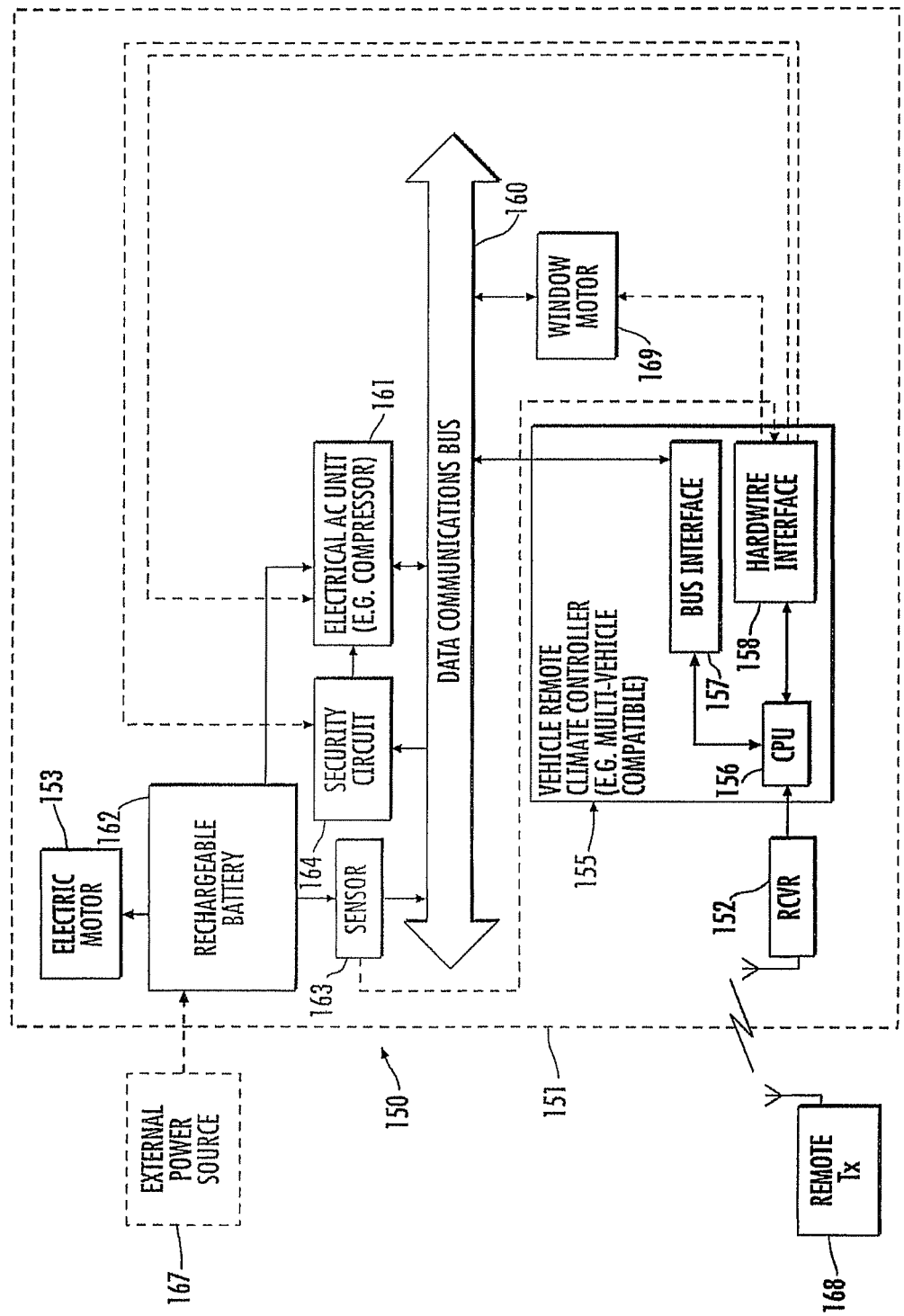
FIG. 9 is a schematic block diagram of an alternative embodiment of a remote climate control system for an electric vehicle in accordance with the present invention.

Referring now to FIG. 9, a further embodiment of a remote climate control system 150 for an electric vehicle 151 is now described. The electric vehicle 151 has a rechargeable battery 162, although those of skill in the art will appreciate that the electric vehicle may have another rechargeable electrical power source, such as a capacitor or flywheel/generator, in addition to or instead of the rechargeable battery. The electric vehicle 151 also has an electric motor 153 coupled to the rechargeable battery 162.

The electric vehicle 151 further comprises an electrical air conditioning (AC) unit 161, for example an AC compressor, selectively powered by the rechargeable battery 162, a sensor 163 associated with the rechargeable battery, and an electric window motor 169. It is to be understood that the sensor 163 is optional that, in some applications, it may not be present.

The electrical AC unit 161 may be a conventional AC compressor coupled to an electric motor via a belt or may be an AC compressor having an internal electric motor. In some embodiments, the electrical AC unit 161 may be a thermoelectric cooler or other suitable electric AC unit as known to those of skill in the art.

The electric vehicle 151 further comprises an electrical AC unit 161 selectively powered by the rechargeable battery 162, a sensor 163 associated with the rechargeable battery, and an electric window motor 169. The electrical AC unit 161 may be a conventional AC unit coupled to an electric motor via a belt or may be an AC unit having an internal electric motor. In some embodiments, there may be a thermoelectric cooler in addition to or instead of the electrical AC unit 161.

The electric vehicle 151 may also include a security circuit 164 connected to the electrical AC unit 161. The security circuit 164 selectively disables the electrical AC unit 161. Those of skill in the art will appreciate that, in some applications, the security circuit 164 may selectively disable operation of a plurality of, or all of, the devices and functions of the electric vehicle 151. The security circuit 164 may be considered as an ignition switch of a conventional internal combustion engine vehicle.

The electric vehicle 151 has a data communications bus 160 extending throughout. The data communications bus 160 may extend through at least one of the engine compartment, the passenger compartment, and the trunk of the electric vehicle 151.

The sensor 163 is coupled to the rechargeable battery 162 and reads the voltage thereof. The sensor 163 may, additionally or alternatively, be able to detect whether the rechargeable battery is connected to an external power source 167. The external power source 167 may be an electrical socket or recharging station.

The electrical AC unit 161, the sensor 163, the security circuit 164, and the window motor 169 are each coupled to the data communications bus 160 for communication thereover. Those of skill in the art will understand that each of the electrical AC unit 161, the sensor 163, the security circuit 164, and the window motor 169 need not be on the data communications bus 160. Indeed, one of, or a plurality of, the electrical AC unit 161, the sensor 163, the security circuit 164, and the window motor 69 may be on the data communications bus 160.

The remote climate control system 150 includes a remote transmitter 168 and a receiver 152 positioned at the electric vehicle 151 for receiving signals from the remote transmitter. The remote climate control system 150 also includes a vehicle remote climate controller 155 to cooperate with the receiver 152. Those of skill in the art will understand that the receiver 152 and the vehicle remote climate controller 155 may be associated together in a same housing. In fact the receiver 152 and the vehicle remote climate controller 155 may each be embodied on a same printed circuit board or even in a same integrated circuit.

The vehicle remote climate controller 155 bypasses the security circuit 164 to enable operation of the electrical AC unit 161. The security circuit 164 selectively disables the electrical AC unit 161.

The vehicle remote climate controller 155 is coupled to the data communications bus 160 extending within the electric vehicle 151 for communication thereover to selectively operate the electrical AC unit 161 responsive to the sensor 163 and the remote transmitter 168. The vehicle remote climate controller 155 selectively operates the electrical AC unit 161 responsive to the sensor 163 and the remote transmitter 168.

The vehicle remote climate controller 155 may selectively operate the window motor 169 to assist cooling the passenger compartment of the electric vehicle 151. For example, the vehicle remote climate controller 155 may operate the window motor 169 to open the window during operation of the electrical AC unit 161. The electric vehicle 151 may have a rain sensor to detect precipitation. The rain sensor may be on the data bus 160. The vehicle remote climate controller 155 may communicate with the rain sensor through the data bus 160 or through the hardwire interface 158. If precipitation is detected, the vehicle remote climate controller 155 will not operate the window motor 169 to open the window. Similarly, if precipitation is detected while the window is open, the vehicle remote climate controller 155 will operate the window motor 169 to close the window.

The remote transmitter 168 may cause the vehicle remote climate controller 155 to cool the passenger compartment of the electric vehicle 151 to a pre-set temperature. Alternatively, the remote transmitter 168 may have buttons that enable a user to set the temperature which the vehicle remote climate controller 155 is to cool the passenger compartment of the electric vehicle 151 to. Additionally or alternatively, the remote transmitter 168 may have buttons that enable a user to select which of a plurality of pre-set temperatures the vehicle remote climate controller 155 is to cool the passenger compartment of the electric vehicle 151 to.

The remote transmitter 168 may be a small portable unit including a housing, function control switches carried by the housing, a battery within the housing, and the associated wireless transmitter circuitry also within the housing. The communications from the remote transmitter 168 to the receiver 152 at the vehicle is typically a direct radio frequency link. In other words, there are no intervening communications links. However, in other embodiments, the remote transmitter 168 may indirectly communicate with the receiver 152 via other communications infrastructure, such as via satellite, or cellular communications, via the public switched telephone network (PSTN) and/or over the World Wide Web or Internet, as will be appreciated by those skilled in the art.

The remote transmitter 168 may also include one or more central station transmitters, such as may be provided by a satellite transmitter or cellular telephone transmitter, for example. Such a central station transmitter may also be connected to other communications infrastructures. In some embodiments, the remote transmitter 168 may optionally include a remote receiver (not shown), such as to provide status information to the user relating to the temperature of the passenger compartment of the electric vehicle 151.

The remote transmitter 168 may be a common remote transmitter. By common remote transmitter, it is meant that the remote transmitter 168 may operate a plurality of electric vehicles 151. Such a feature may be desirable to a driver who owns multiple electric vehicles 151 or to a rental car company, for example.

The vehicle remote climate controller 155 includes a central processing unit (CPU) 156 which performs the signal processing and logic functions to control operation of the electrical AC unit 161. The vehicle remote climate controller 155 also includes a bus interface 157 and a hardwire interface 158. The bus interface 157 includes circuitry for interfacing to the proper signal levels and formats on the data communications bus 160 as will be appreciated by those skilled in the art without further discussion herein.

In some applications, the hardwire interface 158 is to directly interface with the sensor 163, electrical AC unit 161, security circuit 164, and window motor 69. It should be understood that in these applications, one of the sensor 163, security circuit 164, electrical AC unit 161, and window motor 69 may each be directly connected to the hardwire interface 158, or that a plurality of the sensor, security circuit, electrical heater, and window motor may be directly connected to the hardwire interface.

As stated above, the vehicle remote climate controller 125 selectively operates the electrical AC unit 161 responsive to the sensor 163 and the remote transmitter 168. For example, the vehicle remote climate controller 155 may operate the electrical AC unit 161 if it receives, via the receiver 152, a signal from the remote transmitter 168 causing it to do so.

If, during operation of the electrical AC unit 161, the sensor 163 senses that the voltage of the rechargeable battery 162 has fallen below a threshold voltage, the vehicle remote climate controller 155 may disable the electrical AC unit to conserve the voltage of the rechargeable battery. Similarly, if the vehicle remote climate controller 125 receives an instruction to activate the electrical AC unit 161, but the sensor 163 senses that the voltage of the rechargeable battery 162 is below a threshold voltage, the vehicle remote climate controller 155 may not activate the electrical AC unit. This feature helps to prevent excessive discharging of the rechargeable battery 162, due to operation of the electrical AC unit 161, that might leave a driver stranded and the electric vehicle 151 inoperable.

The vehicle remote climate controller 155 may enable the electrical AC unit 161 based upon the sensor sensing the rechargeable battery 162 being coupled to an external power source 167. The external power source 167 may be an electrical socket, a recharging station, or other external power source as known to those skilled in the art.

In some applications, the electric vehicle may have a solar panel, such as on the roof thereof, coupled to the rechargeable battery 162. The vehicle remote climate controller 155 may enable the electrical AC unit 161 based upon the sensor sensing the rechargeable battery 162 being recharged by the solar panel.

Those of skill in the art will appreciate that the sensor 163 may also measure the current flowing in of or out of the rechargeable battery 162 and that the vehicle remote climate controller 155 may operate the electrical AC unit 161 based thereupon in the same manner as described above with reference to voltages of the rechargeable battery. Similarly, the sensor 163 may measure the temperature of the rechargeable battery 162 and the vehicle remote climate controller 155 may operate the electrical AC unit 161 based thereupon in the same manner as described above with reference to the voltage of the rechargeable battery.

Figure 10:
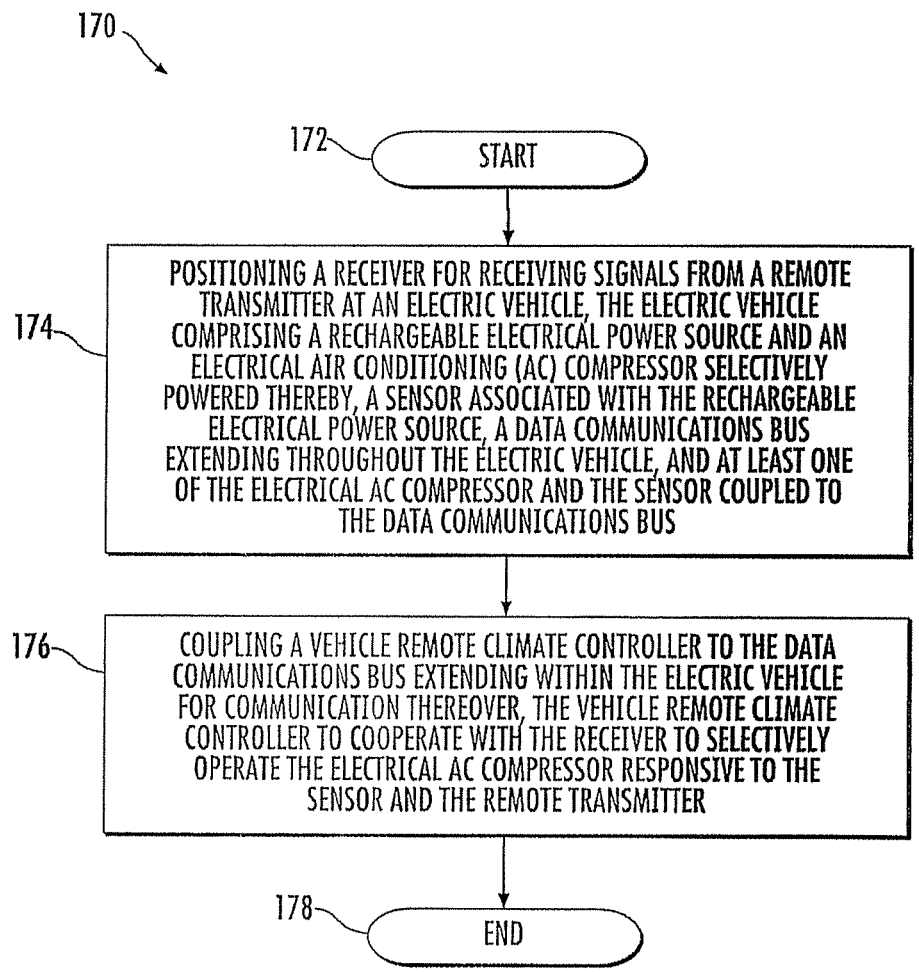
FIG. 10 is a flowchart of a method of installing the remote climate control system of FIG. 9 in an electric vehicle.

A method of installing a remote climate controller 155 in an electric vehicle 151 is now described with reference to the flowchart 170 of FIG. 10. After the start (Block 172), at Block 74 a receiver 152 for receiving signals from a remote transmitter 168 is positioned at an electric vehicle 151. The electric vehicle 151 comprises a rechargeable electrical power source 132 and an electrical AC unit 161 selectively powered thereby, a sensor 163 associated with the rechargeable electrical power source, and a data communications bus 160 extending throughout the electric vehicle. At least one of the electrical AC unit 161 and the sensor 163 is coupled to the data communications bus 160.

At Block 176 a vehicle remote climate controller 155 is coupled to the data communications bus 160 extending within the electric vehicle 151 for communication thereover. The vehicle remote climate controller 155 is to cooperate with the receiver 152 to selectively operate the electrical AC unit 161 responsive to the sensor 163 and the remote transmitter 168. Block 178 indicates the end of the method.

In other words, the method includes coupling a vehicle remote climate controller 155 to the data communications bus 160 extending within the electric vehicle 151 for communication thereof, the vehicle remote climate controller 155 to cooperate with a receiver 152 to selectively operate the electrical AC unit 161 responsive to the sensor 163 and the remote transmitter 168.

The vehicle remote climate controller 155 may disable the electrical AC unit 161 based upon the sensor 163 sensing a voltage of the rechargeable electrical power source 162 being below a threshold.

The vehicle remote climate controller 155 may enable the electrical AC unit 161 based upon the sensor 163 sensing the rechargeable electrical power source 162 being coupled to an external power source 167. The vehicle remote climate controller 155 may comprise a multi-vehicle compatible remote climate controller.

Figure 11:
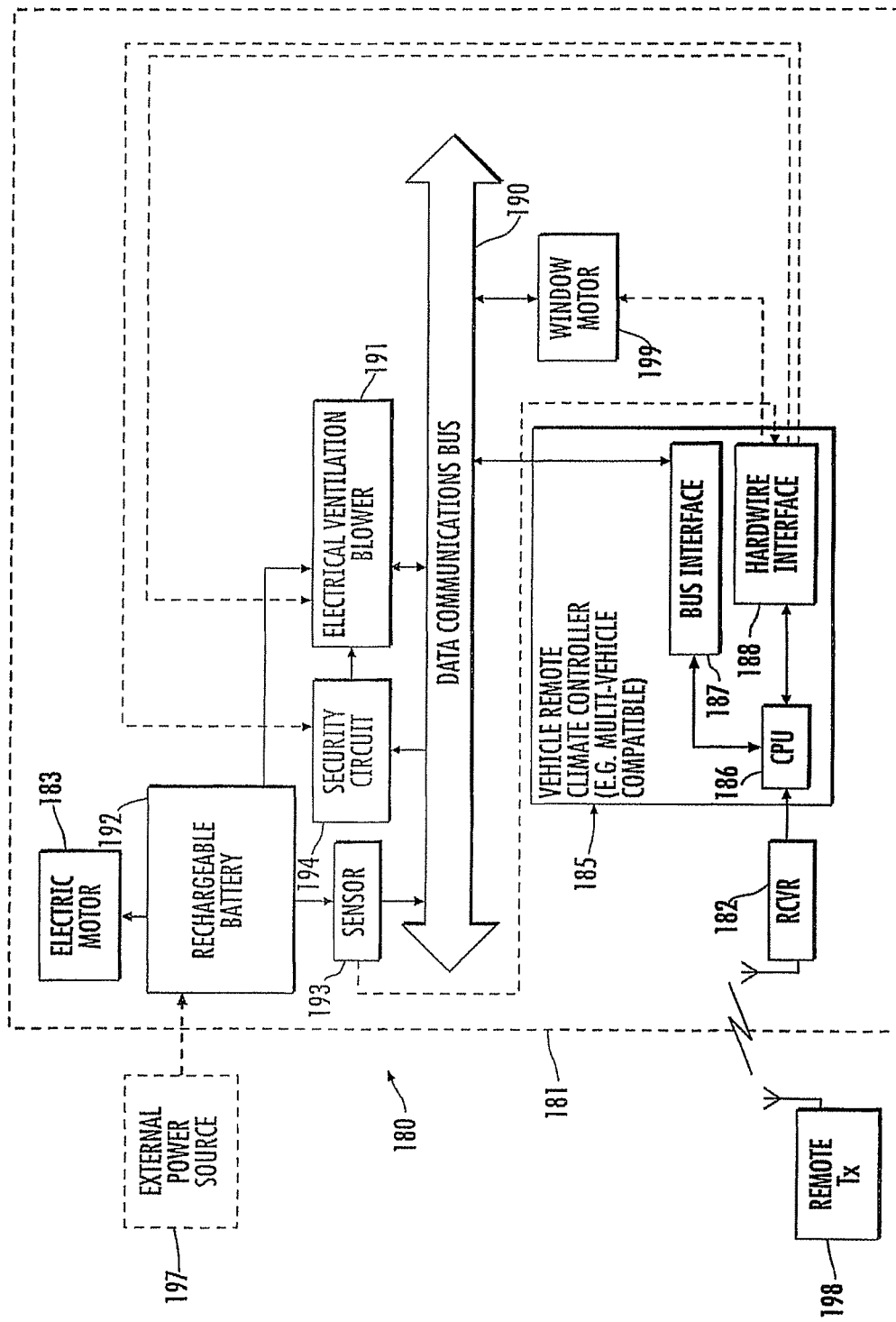
FIG. 11 is a schematic block diagram of a further embodiment of a remote climate control system for an electric vehicle in accordance with the present invention.

Referring now to FIG. 11, still another embodiment of a remote climate control system 180 for an electric vehicle 181 is now described. The electric vehicle 181 has a rechargeable battery 192, although those of skill in the art will appreciate that the electric vehicle may have another rechargeable electrical power source, such as a capacitor, fuel cell, or flywheel/generator, in addition to or instead of the rechargeable battery. The electric vehicle 181 also includes an electric motor 183 coupled to the rechargeable battery 192.

The electric vehicle 181 further comprises an electrical ventilation blower 191 selectively powered by the rechargeable battery 192, a sensor 193 associated with the rechargeable battery, and an electric window motor 199. It is to be understood that the sensor 193 is optional and that, in some applications, will not be present.

The electrical ventilation blower 191 may be a conventional blower coupled to an electric motor via a belt or may be an electrical ventilation blower having an internal electric motor. It should be understood that the electric ventilation blower 191 merely blows ambient outside air into the passenger compartment of the vehicle and does not actively cool the air, as would an electric AC unit. It may be advantageous to use the electrical ventilation blower 191 to cool the passenger compartment of the electric vehicle 181 as opposed to an electrical AC unit such as an electrical AC unit because the electrical ventilation blower may consume less electricity.

The electric vehicle 181 may also include a security circuit 194 connected to the electrical ventilation blower 191. The security 194 circuit selectively disables the electrical ventilation blower 191. Those of skill in the art will appreciate that, in some applications, the security circuit 194 may selectively disable operation of a plurality of, or all of, the devices and functions of the electric vehicle 181. The security circuit 194 may be considered as an ignition switch of a conventional internal combustion engine vehicle.

The electric vehicle 181 has a data communications bus 190 extending throughout. The data communications bus 190 may extend through at least one of the engine compartment, the passenger compartment, and the trunk of the electric vehicle 181.

The sensor 193 is coupled to the rechargeable battery 192 and reads the voltage thereof. The sensor 193 may, additionally or alternatively, be able to detect whether the rechargeable battery is connected to an external power source 197. The external power source 197 may be an electrical socket or recharging station.

The electrical ventilation blower 191, the sensor 193, the security circuit 194, and the window motor 199 are each coupled to the data communications bus 190 for communication thereover. Those of skill in the art will understand that each of the electrical ventilation blower 191, the sensor 193, the security circuit 194, the combustion engine starter 96, and the window motor 199 need not be on the data communications bus 190. Indeed, one of, or a plurality of, the electrical ventilation blower 191, the sensor 193, the security circuit 194 and the window motor 199 may be on the data communications bus 190.

The remote climate control system 180 includes a remote transmitter 198 and a receiver 182 positioned at the electric vehicle 181 for receiving signals from the remote transmitter. The remote climate control system 180 also includes a vehicle remote climate controller 185 to cooperate with the receiver 182. Those of skill in the art will understand that the receiver 182 and the vehicle remote climate controller 185 may be associated together in a same housing. In fact the receiver 182 and the vehicle remote climate controller 185 may each be embodied on a same printed circuit board or even in a same integrated circuit.

The vehicle remote climate controller 185 bypasses the security circuit 194 to enable operation of the electrical ventilation blower 191. The security circuit 194 selectively disables the electrical ventilation blower 191.

The vehicle remote climate controller 185 is coupled to the data communications bus 190 extending within the electric vehicle 181 for communication thereover to selectively operate the electrical ventilation blower 191 responsive to the sensor 193 and the remote transmitter 198. The vehicle remote climate controller 185 selectively operates the electrical ventilation blower 191 responsive to the sensor 193 and the remote transmitter 198.

The vehicle remote climate controller 185 may selectively operate the window motor 199 to assist cooling the passenger compartment of the electric vehicle 181. For example, the vehicle remote climate controller 185 may operate the window motor 199 to open the window during operation of the electrical ventilation blower 191. The electric vehicle 181 may have a rain sensor to detect precipitation. The rain sensor may be on the data bus 190. The vehicle remote climate controller 185 may communicate with the rain sensor through the data bus 190 or through the hardwire interface 188. If precipitation is detected, the vehicle remote climate controller 185 will not operate the window motor 199 to open the window. Similarly, if precipitation is detected while the window is open, the vehicle remote climate controller 185 will operate the window motor 199 to close the window.

The remote transmitter 198 may cause the vehicle remote climate controller 185 to cool the passenger compartment of the electric vehicle 181 to a pre-set temperature. Alternatively, the remote transmitter 198 may have buttons that enable a user to set the temperature which the vehicle remote climate controller 185 is to cool the passenger compartment of the electric vehicle 181 to. Additionally or alternatively, the remote transmitter 198 may have buttons that enable a user to select which of a plurality of pre-set temperatures the vehicle remote climate controller 185 is to cool the passenger compartment of the electric vehicle 181 to.

The remote transmitter 198 may be a small portable unit including a housing, function control switches carried by the housing, a battery within the housing, and the associated wireless transmitter circuitry also within the housing. The communications from the remote transmitter 198 to the receiver 182 at the vehicle is typically a direct radio frequency link. In other words, there are no intervening communications links. However, in other embodiments, the remote transmitter 198 may indirectly communicate with the receiver 182 via other communications infrastructure, such as via satellite, or cellular communications, via the public switched telephone network (PSTN) and/or over the World Wide Web or Internet, as will be appreciated by those skilled in the art.

The remote transmitter 198 may also include one or more central station transmitters, such as may be provided by a satellite transmitter or cellular telephone transmitter, for example. Such a central station transmitter may also be connected to other communications infrastructures. In some embodiments, the remote transmitter 198 may optionally include a remote receiver (not shown), such as to provide status information to the user relating to the temperature of the passenger compartment of the electric vehicle 181.

The remote transmitter 198 may be a common remote transmitter. By common remote transmitter, it is meant that the remote transmitter 198 may operate a plurality of electric vehicles 181. Such a feature may be desirable to a driver who owns multiple electric vehicles 181 or to a rental car company, for example.

The vehicle remote climate controller 185 includes a central processing unit (CPU) 186 which performs the signal processing and logic functions to control operation of the electrical ventilation blower 191. The vehicle remote climate controller 185 also includes a bus interface 187 and a hardwire interface 188. The bus interface 187 includes circuitry for interfacing to the proper signal levels and formats on the data communications bus 190 as will be appreciated by those skilled in the art without further discussion herein.

In some applications, the hardwire interface 188 is to directly interface with the sensor 193, electrical ventilation blower 191, security circuit 194, combustion engine starter 96, and window motor 199. It should be understood that in these applications, one of the sensor 193, security circuit 194, electrical ventilation blower 191, and window motor 199 may each be directly connected to the hardwire interface 188, or that a plurality of the sensor, security circuit, electrical heater, combustion engine starter, and window motor may be directly connected to the hardwire interface.

As stated above, the vehicle remote climate controller 125 selectively operates the electrical ventilation blower 191 responsive to the sensor 193 and the remote transmitter 198. For example, the vehicle remote climate controller 185 may operate the electrical ventilation blower 191 if it receives, via the receiver 182, a signal from the remote transmitter 198 instructing it to do so.

If, during operation of the electrical ventilation blower 191, the sensor 193 senses that the voltage of the rechargeable battery 192 has fallen below a threshold voltage, the vehicle remote climate controller 185 may disable the electrical ventilation blower to conserve the voltage of the rechargeable battery. Similarly, if the vehicle remote climate controller 125 receives an instruction to activate the electrical ventilation blower 191, but the sensor 193 senses that the voltage of the rechargeable battery 192 is below a threshold voltage, the vehicle remote climate controller 185 may not activate the electrical ventilation blower. This feature helps to prevent excessive discharging of the rechargeable battery 192, due to operation of the electrical ventilation blower 191, that might leave a driver stranded and the electric vehicle 181 inoperable.

The vehicle remote climate controller 185 may enable the electrical ventilation blower 191 based upon the sensor sensing the rechargeable battery 192 being coupled to an external power source 197. The external power source 197 may be an electrical socket, a recharging station, or other external power source as known to those skilled in the art.

In some applications, the electric vehicle may have a solar panel, such as on the roof thereof, coupled to the rechargeable battery 192. The vehicle remote climate controller 185 may enable the electrical ventilation blower 191 based upon the sensor sensing the rechargeable battery 192 being recharged by the solar panel.

Those of skill in the art will appreciate that the sensor 193 may also measure the current flowing in of or out of the rechargeable battery 192 and that the vehicle remote climate controller 185 may operate the electrical ventilation blower 191 based thereupon in the same manner as described above with reference to voltages of the rechargeable battery. Similarly, the sensor 193 may measure the temperature of the rechargeable battery 192 and the vehicle remote climate controller 185 may operate the electrical ventilation blower 191 based thereupon in the same manner as described above with reference to the voltage of the rechargeable battery.

Figure 12:
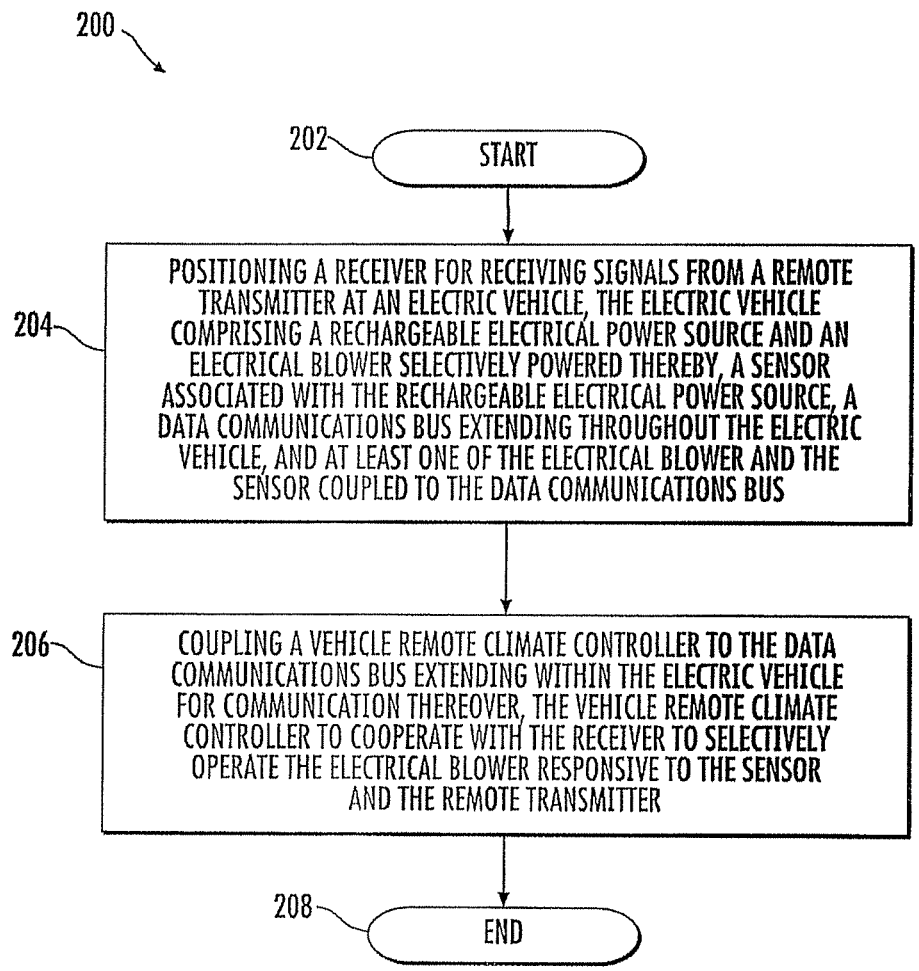
FIG. 12 is a flowchart of a method of installing the remote climate control system of FIG. 11 in an electric vehicle.

A method of installing a remote climate controller 185 in an electric vehicle 181 is now described with reference to the flowchart 100 of FIG. 12. After the start (Block 202), at Block 204 a receiver 182 for receiving signals from a remote transmitter 198 is positioned at an electric vehicle 181. The electric vehicle 181 comprises a rechargeable electrical power source 132 and an electrical ventilation blower 191 selectively powered thereby, a sensor 193 associated with the rechargeable electrical power source, and a data communications bus 190 extending throughout the electric vehicle. At least one of the electrical ventilation blower 191 and the sensor 193 is coupled to the data communications bus 190.

At Block 206 a vehicle remote climate controller 185 is coupled to the data communications bus 190 extending within the electric vehicle 181 for communication thereover. The vehicle remote climate controller 185 is to cooperate with the receiver 182 to selectively operate the electrical ventilation blower 191 responsive to the sensor 193 and the remote transmitter 198. Block 208 indicates the end of the method.

In other words, the method includes coupling a vehicle remote climate controller 185 to the data communications bus 190 extending within the electric vehicle 181 for communication thereover, the vehicle remote climate controller 185 to cooperate with a receiver 182 to selectively operate the electrical ventilation blower 191 responsive to the sensor 193 and the remote transmitter 198.

The vehicle remote climate controller 185 may disable the electrical ventilation blower 191 based upon the sensor 193 sensing a voltage of the rechargeable electrical power source 192 being below a threshold.

The vehicle remote climate controller 185 may enable the electrical ventilation blower 191 based upon the sensor 193 sensing the rechargeable electrical power source 192 being coupled to an external power source 197. The vehicle remote climate controller 185 may comprise a multi-vehicle compatible remote climate controller.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A remote climate control system for a hybrid vehicle comprising a rechargeable electrical power source and an electrical heater selectively powered thereby, a sensor associated with the rechargeable electrical power source, a data communications bus extending throughout the hybrid vehicle, and at least one of the electrical heater and the sensor coupled to the data communications bus, the remote climate control system comprising:

a remote transmitter;
a receiver to be positioned at the hybrid vehicle for receiving signals from said remote transmitter; and
a vehicle remote climate controller cooperating with said receiver and to be coupled to the data communications bus extending within the hybrid vehicle for communication thereover to selectively operate the electrical heater responsive to the sensor and said remote transmitter, said vehicle remote climate controller disabling the electrical heater based upon the sensor sensing a voltage of the rechargeable electrical power source being below a threshold.

2. The remote climate control system of claim 1 wherein the sensor is coupled to the data communications bus; and wherein said vehicle remote climate controller receives signals from the sensor via the data communications bus.

3. The remote climate control system of claim 1 wherein the electrical heater is coupled to the data communications bus; and wherein said vehicle remote climate controller sends signals to the electrical heater via the data communications bus.

4. The remote climate control system of claim 1 wherein the hybrid vehicle further comprises a combustion engine; and wherein said vehicle remote climate controller starts the combustion engine based upon the sensor sensing a voltage of the rechargeable electrical power source being below a threshold.

5. The remote climate control system of claim 1 wherein the hybrid vehicle further comprises a security circuit coupled to the electrical heater for selectively enabling operation thereof; and wherein said vehicle remote climate controller bypasses the security circuit to enable remote operation of the electrical heater.

6. The remote climate control system of claim 1 wherein said remote transmitter comprises a remote wireless handheld transmitter to be carried by a user when away from the vehicle.

7. The remote temperature climate system according to claim 1 wherein said vehicle remote climate controller comprises a multi-vehicle compatible remote climate controller.

8. A remote climate control system for a hybrid vehicle comprising a rechargeable electrical power source and an electrical heater selectively powered thereby, a sensor associated with the rechargeable electrical power source, a data communications bus extending throughout the hybrid vehicle, the electrical heater coupled to the data communications bus, the remote climate control system comprising:
a remote transmitter comprising a remote wireless handheld transmitter to be carried by a user when away from the vehicle;
a receiver to be positioned at the hybrid vehicle for receiving signals from said remote transmitter; and
a vehicle remote climate controller cooperating with said receiver and to be coupled to the data communications bus extending within the hybrid vehicle for communication thereover to selectively operate the electrical heater responsive to the sensor and said remote transmitter, said vehicle remote climate controller disabling the electrical heater based upon the sensor sensing a voltage of the rechargeable electrical power source being below a threshold.

9. The remote climate control system of claim 8 wherein the hybrid vehicle further comprises a combustion engine; and wherein said vehicle remote climate controller starts the combustion engine based upon the sensor sensing a voltage of the rechargeable electrical power source being below a threshold.

10. The remote climate control system of claim 8 wherein the hybrid vehicle further comprises a security circuit coupled to the electrical heater for selectively enabling operation thereof; and wherein said vehicle remote climate controller bypasses the security circuit to enable remote operation of the electrical heater.

11. A remote climate control system for a hybrid vehicle comprising a rechargeable electrical power source and an electrical heater selectively powered thereby, a sensor associated with the rechargeable electrical power source, a data communications bus extending throughout the hybrid vehicle, the sensor coupled to the data communications bus, the remote climate control system comprising:
a remote transmitter comprising a remote wireless handheld transmitter to be carried by a user when away from the vehicle;
a receiver to be positioned at the hybrid vehicle for receiving signals from said remote transmitter; and
a vehicle remote climate controller cooperating with said receiver and to be coupled to the data communications bus extending within the hybrid vehicle for communication thereover to selectively operate the electrical heater responsive to the sensor and said remote transmitter, said vehicle remote climate controller disabling the electrical heater based upon the sensor sensing a voltage of the rechargeable electrical power source being below a threshold.

12. The remote climate control system of claim 11 wherein the hybrid vehicle further comprises a combustion engine; and wherein said vehicle remote climate controller starts the combustion engine based upon the sensor sensing a voltage of the rechargeable electrical power source being below a threshold.

13. The remote climate control system of claim 11 wherein the hybrid vehicle further comprises a security circuit coupled to the electrical heater for selectively enabling operation thereof; and wherein said vehicle remote climate controller bypasses the security circuit to enable remote operation of the electrical heater.

14. A method of installing a remote climate control system in a hybrid vehicle comprising a rechargeable electrical power source and an electrical heater selectively powered thereby, a sensor associated with the rechargeable electrical power source, a data communications bus extending throughout the hybrid vehicle, and at least one of the electrical heater and the sensor coupled to the data communications bus, the method comprising:
coupling a vehicle remote climate controller to the data communications bus extending within the hybrid vehicle for communication thereover, the vehicle remote climate controller to cooperate with a receiver to selectively operate the electrical heater responsive to the sensor and the remote transmitter, the vehicle remote climate controller disabling the electrical heater based upon the sensor sensing a voltage of the rechargeable electrical power source being below a threshold.

15. The method of claim 14 wherein the hybrid vehicle further comprises a combustion engine; and wherein the vehicle remote climate controller is to start the combustion engine based upon the sensor sensing a voltage of the rechargeable electrical power source being below a threshold.

16. The method of claim 14 wherein the vehicle remote climate controller comprises a multi-vehicle compatible remote climate controller.

17. A remote climate control system for a hybrid vehicle comprising a rechargeable electrical power source and an electrical heater selectively powered thereby, a sensor associated with the rechargeable electrical power source, a data communications bus extending throughout the hybrid vehicle, and at least one of the electrical heater and the sensor coupled to the data communications bus, the remote climate control system comprising:

a remote transmitter;

a receiver to be positioned at the hybrid vehicle for receiving signals from said remote transmitter; and a vehicle remote climate controller cooperating with said receiver and to be coupled to the data communications bus extending within the hybrid vehicle for communication thereover to selectively operate the electrical heater responsive to the sensor and said remote transmitter, said vehicle remote climate controller enabling the electrical heater based upon the sensor sensing the rechargeable electrical power source being coupled to an external power source.

18. The remote climate control system of claim 17 wherein the sensor is coupled to the data communications bus; and wherein said vehicle remote climate controller receives signals from the sensor via the data communications bus.

19. The remote climate control system of claim 17 wherein the electrical heater is coupled to the data communications bus; and wherein said vehicle remote climate controller sends signals to the electrical heater via the data communications bus.

20. The remote climate control system of claim 17 wherein the hybrid vehicle further comprises a combustion engine; and wherein said vehicle remote climate controller starts the combustion engine based upon the sensor sensing a voltage of the rechargeable electrical power source being below a threshold.

21. The remote climate control system of claim 17 wherein the hybrid vehicle further comprises a security circuit coupled to the electrical heater for selectively enabling operation thereof; and wherein said vehicle remote climate controller bypasses the security circuit to enable remote operation of the electrical heater.

22. The remote climate control system of claim 17 wherein said remote transmitter comprises a remote wireless handheld transmitter to be carried by a user when away from the vehicle.

23. The remote temperature climate system according to claim 17 wherein said vehicle remote climate controller comprises a multi-vehicle compatible remote climate controller.

24. A remote climate control system for a hybrid vehicle comprising a rechargeable electrical power source and an electrical heater selectively powered thereby, a sensor associated with the rechargeable electrical power source, a data communications bus extending throughout the hybrid vehicle, the electrical heater coupled to the data communications bus, the remote climate control system comprising:

a remote transmitter comprising a remote wireless handheld transmitter to be carried by a user when away from the vehicle;

a receiver to be positioned at the hybrid vehicle for receiving signals from said remote transmitter; and a vehicle remote climate controller cooperating with said receiver and to be coupled to the data communications bus extending within the hybrid vehicle for communication thereover to selectively operate the electrical heater responsive to the sensor and said remote transmitter, said vehicle remote climate controller enabling the electrical heater based upon the sensor sensing the rechargeable electrical power source being coupled to an external power source.

25. The remote climate control system of claim 24 wherein the hybrid vehicle further comprises a combustion engine; and wherein said vehicle remote climate controller starts the combustion engine based upon the sensor sensing a voltage of the rechargeable electrical power source being below a threshold.

26. The remote climate control system of claim 24 wherein the hybrid vehicle further comprises a security circuit coupled to the electrical heater for selectively enabling operation thereof; and wherein said vehicle remote climate controller bypasses the security circuit to enable remote operation of the electrical heater.

27. A remote climate control system for a hybrid vehicle comprising a rechargeable electrical power source and an electrical heater selectively powered thereby, a sensor associated with the rechargeable electrical power source, a data communications bus extending throughout the hybrid vehicle, the sensor coupled to the data communications bus, the remote climate control system comprising:

a remote transmitter comprising a remote wireless handheld transmitter to be carried by a user when away from the vehicle;

a receiver to be positioned at the hybrid vehicle for receiving signals from said remote transmitter; and a vehicle remote climate controller cooperating with said receiver and to be coupled to the data communications bus extending within the hybrid vehicle for communication thereover to selectively operate the electrical heater responsive to the sensor and said remote transmitter, said vehicle remote climate controller enabling the electrical heater based upon the sensor sensing the rechargeable electrical power source being coupled to an external power source.

28. The remote climate control system of claim 27 wherein the hybrid vehicle further comprises a combustion engine; and wherein said vehicle remote climate controller starts the combustion engine based upon the sensor sensing a voltage of the rechargeable electrical power source being below a threshold.

29. The remote climate control system of claim 27 wherein the hybrid vehicle further comprises a security circuit coupled to the electrical heater for selectively enabling operation thereof; and wherein said vehicle remote climate controller bypasses the security circuit to enable remote operation of the electrical heater.

30. A method of installing a remote climate control system in a hybrid vehicle comprising a rechargeable electrical power source and an electrical heater selectively powered thereby, a sensor associated with the rechargeable electrical power source, a data communications bus extending throughout the hybrid vehicle, and at least one of the electrical heater and the sensor coupled to the data communications bus, the method comprising:

coupling a vehicle remote climate controller to the data communications bus extending within the hybrid vehicle for communication thereover, the vehicle remote climate controller to cooperate with a receiver to selectively operate the electrical heater responsive to the sensor and the remote transmitter, the vehicle remote climate controller enabling the electrical heater based upon the sensor sensing the rechargeable electrical power source being coupled to an external power source.

31. The method of claim 30 wherein the hybrid vehicle further comprises a combustion engine; and wherein the vehicle remote climate controller is to start the combustion engine based upon the sensor sensing a voltage of the rechargeable electrical power source being below a threshold.

32. The method of claim 30 wherein the vehicle remote climate controller comprises a multi-vehicle compatible remote climate controller.

\* \* \* \* \*